US010226962B2

(12) United States Patent
Champion et al.

(10) Patent No.: US 10,226,962 B2
(45) Date of Patent: Mar. 12, 2019

(54) VEHICLE WHEEL INCLUDING ANTIROTATION PLATE

(71) Applicant: Honeywell International Inc., Morris Plains, NJ (US)

(72) Inventors: Jon Champion, Granger, IN (US); Elliot Conrad, South Bend, IN (US); Jonathan T. Beehler, Bremen, IN (US); Thomas Regnier, Elkhart, IN (US)

(73) Assignee: Honeywelll International Inc., Morris Plains, NJ (US)

( * ) Notice: Subject to any disclaimer, the term of this patent is extended or adjusted under 35 U.S.C. 154(b) by 103 days.

(21) Appl. No.: 15/369,278

(22) Filed: Dec. 5, 2016

(65) Prior Publication Data

US 2018/0154689 A1    Jun. 7, 2018

(51) Int. Cl.
*B60B 25/08* (2006.01)
*B60B 25/18* (2006.01)
(Continued)

(52) U.S. Cl.
CPC .............. *B60B 25/08* (2013.01); *B60B 25/14* (2013.01); *B60B 25/18* (2013.01); *B60B 25/20* (2013.01);
(Continued)

(58) Field of Classification Search
CPC ......... B60B 25/08; B60B 25/14; B60B 25/18; B60B 25/20; B60B 25/36;
(Continued)

(56) References Cited

U.S. PATENT DOCUMENTS 1,163,736 A    12/1915  Bryant
1,198,242 A     9/1916  Landers
(Continued)

FOREIGN PATENT DOCUMENTS

EP    2743096 A1    6/2014
FR    1155836 A    5/1958
(Continued)

OTHER PUBLICATIONS

Extended Search Report from counterpart European Application No. 17204233.5, dated May 18, 2018, 7 pp.

*Primary Examiner* — S. Joseph Morano
*Assistant Examiner* — Jean W Charleston
(74) *Attorney, Agent, or Firm* — Shumaker & Sieffert, P.A.

(57) ABSTRACT

A vehicle wheel includes a first annular component, a second annular component configured to be separable from the first annular component and mechanically connected to and aligned with the first annular component about an axis of rotation of the wheel, and a plate. In some examples, when the first and second annular components are mechanically connected, the first and second annular components are configured to receive a tire and define a recess along an annular surface of the first and second annular components, the recess being configured to receive the plate. In addition, in some examples, when the plate is received in the recess, the plate inhibits relative rotation between the first annular component and the second annular component about the axis of rotation of the wheel.

20 Claims, 15 Drawing Sheets

(51) Int. Cl.
*B60B 25/20* (2006.01)
*B64C 25/36* (2006.01)
*B60B 25/14* (2006.01)
*B60B 25/10* (2006.01)
*B60B 25/12* (2006.01)

(52) U.S. Cl.
CPC .............. *B64C 25/36* (2013.01); *B60B 25/10* (2013.01); *B60B 25/12* (2013.01); *B60B 2310/54* (2013.01); *B60B 2310/616* (2013.01); *B60B 2320/50* (2013.01); *B60B 2360/102* (2013.01); *B60B 2360/104* (2013.01); *B60B 2900/311* (2013.01); *B60B 2900/3312* (2013.01); *B60B 2900/711* (2013.01); *B60Y 2200/51* (2013.01)

(58) Field of Classification Search
CPC ............... B60B 2900/711; B60B 25/10; B60B 2900/311; B60B 25/12; B60Y 2200/3312
USPC ...................................... 301/35.1, 35.2, 35.3
See application file for complete search history.

(56) References Cited

U.S. PATENT DOCUMENTS

| | | | |
|---|---|---|---|
| 1,265,310 A | | 5/1918 | Dutton, Jr. |
| 1,294,529 A | | 2/1919 | Park |
| 1,485,100 A | | 9/1921 | Wall |
| 1,433,279 A | | 10/1922 | Howell |
| 1,609,099 A | | 11/1926 | Antilotti et al. |
| 1,836,922 A | | 12/1931 | Helvern |
| 1,880,641 A | | 10/1932 | Woodward |
| 1,892,127 A | | 12/1932 | Baker |
| 2,022,337 A | | 11/1935 | Ervin |
| 2,472,328 A | | 6/1949 | King |
| 2,581,554 A | | 1/1952 | Radford |
| 2,675,048 A | | 4/1954 | Ebert |
| 3,224,484 A | * | 12/1965 | Smith ..................... B60B 25/14 152/398 |
| 3,327,754 A | | 6/1967 | Travers |
| 3,930,683 A | | 1/1976 | MacKeown |
| 4,209,052 A | * | 6/1980 | French .................... B60B 25/18 152/410 |
| 4,552,194 A | | 11/1985 | Brown et al. |
| 4,635,695 A | | 1/1987 | Frank et al. |
| 4,683,930 A | | 8/1987 | Elam et al. |
| 4,757,851 A | | 7/1988 | Van Den Abeele |
| 5,086,821 A | | 2/1992 | Russell et al. |
| 5,107,914 A | * | 4/1992 | Yamoto ................... B60B 25/04 152/409 |
| 5,259,430 A | | 11/1993 | Smith et al. |
| 5,476,128 A | | 12/1995 | Jankowski et al. |
| 5,984,421 A | | 11/1999 | Proctor |
| 6,550,510 B2 | | 4/2003 | Champion |
| 6,715,523 B2 | | 4/2004 | Oba et al. |
| 6,786,259 B2 | | 9/2004 | Vehar et al. |
| 7,284,584 B2 | | 10/2007 | Kimura |
| 7,819,154 B2 | | 10/2010 | Durif |
| 7,971,614 B2 | | 7/2011 | Durif |
| 8,020,943 B2 | | 9/2011 | Kipp et al. |
| 8,347,929 B2 | | 1/2013 | Oba et al. |
| 8,814,276 B2 | | 8/2014 | Brown et al. |
| 8,833,694 B2 | | 9/2014 | Gilleran et al. |
| 2002/0129884 A1 | | 9/2002 | Champion |
| 2006/0086447 A1 | | 4/2006 | Kimura |
| 2008/0251639 A1 | | 10/2008 | Kipp et al. |
| 2012/0248855 A1 | | 10/2012 | Shamo |
| 2014/0182759 A1 | | 7/2014 | Phillis et al. |
| 2014/0292060 A1 | | 10/2014 | Phillis et al. |
| 2015/0183268 A1 | | 7/2015 | Baldassara et al. |
| 2016/0311254 A1 | * | 10/2016 | Dahl ....................... B60B 25/14 |

FOREIGN PATENT DOCUMENTS

| | | |
|---|---|---|
| FR | 2966078 A1 | 4/2012 |
| GB | 289190 | 4/1928 |
| WO | 2007041490 A1 | 4/2007 |
| WO | 2016172102 A1 | 10/2016 |

* cited by examiner

VEHICLE WHEEL INCLUDING ANTIROTATION PLATE

TECHNICAL FIELD

This disclosure relates to demountable wheels.

BACKGROUND

In some examples, an aircraft wheel assembly includes an inboard annular wheel component with an integral inboard tire rim, a demountable separable outboard annular wheel component with an integral outboard tire rim, a split lock ring seated within an annular groove in the inboard wheel component and, in some cases, an arrangement associated with the lock ring to maintain it within the groove independent of tire inflation. Aircraft wheels are subject to a variety of forces during aircraft operation, including, e.g., during takeoff, landing and braking operations. Various mechanisms have been employed to counteract such forces on the wheel assembly and to maintain the integrity and operational characteristics of the assembly under the influence of such forces.

SUMMARY

This disclosure describes systems, devices, and methods for inhibiting rotation between two annular components of a vehicle wheel, such as an aircraft wheel. In some examples, the two annular components define at least one recess along an annular surface defined by the two annular components when the annular components are mechanically connected to each other. Each recess of the at least one recess is configured to receive a respective plate that inhibits (e.g., hinders, minimizes, or even prevents) rotation between the two annular components (relative rotation). The plate may be shaped and otherwise configured (e.g., a thickness, length, and/or width) to withstand the stresses imparted on the plate by relative rotation of the two annular components.

In some examples, a vehicle wheel includes a first annular component, a second annular component configured to be separable from the first annular component and mechanically connected to and aligned with the first annular component about an axis of rotation of the wheel, and a plate. When the first and second annular components are mechanically connected, the first and second annular components are configured to receive a tire and define a recess along an annular surface of the first and second annular components, the recess being configured to receive the plate. When the plate is received in the recess, the plate inhibits relative rotation between the first annular component and the second annular component about the axis of rotation of the wheel.

In some examples, a method of assembling a vehicle wheel, the method including introducing a plate in a recess defined by first and second annular components, the second annular component being configured to be separable from the first annular component and mechanically connected to and aligned with the first annular component about an axis of rotation of the vehicle wheel. When the first and second annular components are mechanically connected, the first and second annular components are configured to receive a tire and define the recess along an annular surface. When the plate is received in the recess, the plate inhibits relative rotation between the first annular component and the second annular component about the axis of rotation of the vehicle wheel.

In some examples, a vehicle wheel includes a first annular component and a second annular component configured to be separable from the first annular component and mechanically connected to and aligned with the first annular component about an axis of rotation of the vehicle wheel. The vehicle wheel further includes a first plate having a rectangular shape and defining rounded corners, a second plate having a rectangular shape and defining rounded corners, a first strap configured to fix the first plate relative to the first and second annular components, and a second strap configured to fix the second plate relative to the first and second annular components. When the first and second annular components are mechanically connected, the first and second annular components are configured to receive a tire and define a first recess and a second recess along an annular surface of the first and second annular components, the first recess having a rectangular shape and being configured to receive the first plate, and the second recess having a rectangular shape and being configured to receive the second plate. When the first plate is received in the first recess, the first plate inhibits relative rotation between the first annular component and the second annular component about the axis of rotation of the vehicle wheel. When the second plate is received in the second recess, the second plate inhibits relative rotation between the first annular component and the second annular component about the axis of rotation of the vehicle wheel. Moreover, the first strap is configured to hold the first plate in the first recess, and the second strap is configured to hold the second plate in the second recess.

The details of one or more examples are set forth in the accompanying drawings and the description below. Other features, objects, and advantages will be apparent from the description and drawings, and from the claims.

DETAILED DESCRIPTION

Figure 1:
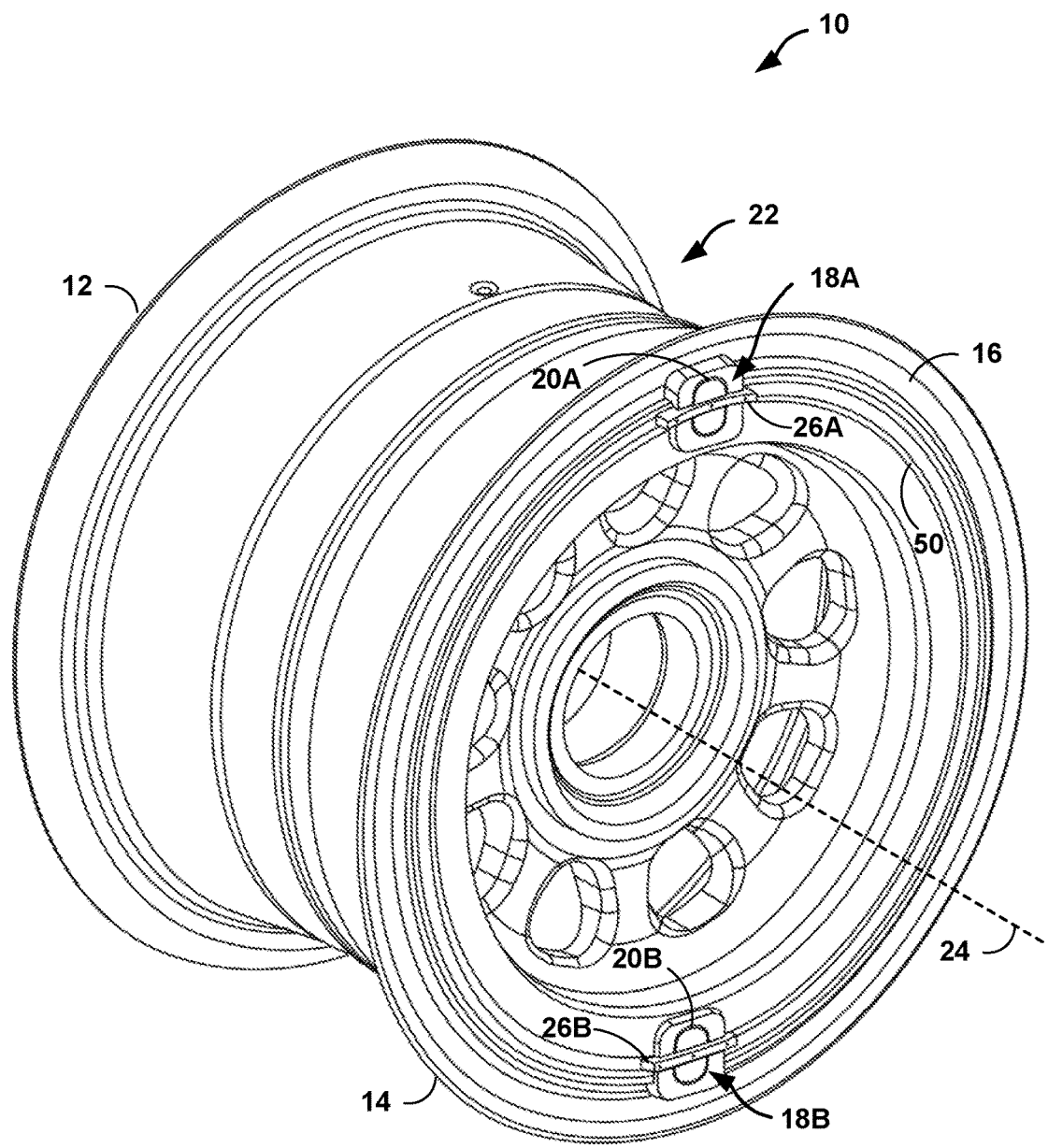
FIG. 1 is a perspective view of an example vehicle wheel including two annular components defining a recess along an annular surface of the two annular components.

Example systems, devices, and methods relating to vehicle wheels, such as demountable flange wheels, that include a first annular component that is mechanically connected to and aligned with a second annular component of the vehicle wheel are described herein. In some examples, the two annular components define a recess along an annular surface of the two annular components, where the recess is configured to receive a plate that inhibits relative rotation between the two annular components. The plate may inhibit relative rotation between the two annular components during high stress events for the vehicle wheel, such as during heavy braking or high acceleration.

The structure of the plate may inhibit relative rotation between the two annular components by bearing torsional and compressive loads from the two annular components. These torsional and compressive loads may be, for example, caused by forces that may ordinarily cause relative rotation between the two annular components. The plate is formed from a material having a strength sufficient to withstand forces applied by one or both annular components on the plate, e.g., during use of the vehicle wheel. The plate and the recess may have any suitable configurations (e.g., shapes and sizes) for inhibiting relative rotation between the annular components. In some examples, the plate may include rounded corners in plane with the annular surface and curved contact surfaces out of plane with the annular surface. The in-plane rounded corners walls of the plate and the recess may include compound radii designed to distribute the loads experienced by the plate to reduce the peak stresses on the plate. In some examples, the in-plane shape of the recess may substantially mirror the in-plane shape of the plate, which may help increase the surface area of contact between the walls of the recess and the plate. The out-of-plane curved contact surfaces of the plate may distribute the Hertzian forces to reduce the peak stress at the perimeter of the contact.

In some examples, a vehicle wheel may include one or more plates configured to inhibit relative rotation between the annular components of the wheel. In examples in which a vehicle wheel includes two or more plates, an annular surface defined by the annular components (when mechanically connected) may define two or more recesses configured to receive respective plates. In some examples, the recesses and plates may be equally distributed around the annular surface of the vehicle wheel. Substantially equally (e.g., equally or nearly equally) distributing the plates and recesses around the annular surface may balance the extra weight of the plates and recesses about an axis of rotation of the vehicle wheel, and may, therefore, help with performance and wear of the wheel. For example, in a vehicle wheel including two plates, the plates may be diametrically opposed. However, other relative arrangements of the plates and recesses may also be used in other examples.

While each additional plate may reduce the load borne by each of the other plates, the usefulness of reducing the load borne by a plate may be balanced with the disadvantages of adding another plate, such as the work required to assemble the vehicle wheel and the cost of each plate. While the figures are primarily described with reference to an example vehicle wheel including two plates, in other examples, the vehicle wheels described herein may include one plate or more than two plates. A single plate may help inhibit relative rotation between annular components of a vehicle wheel, such that several advantages may be achieved from using only one plate. In some examples in which a single plate is used, however, a balance counterweight may be applied (e.g., diametrically opposed to the plate) in order to help maintain balance in the wheel. Without such counterbalancing, the wear of the wheel may be uneven and/or performance of the wheel may be adversely impacted.

FIG. 1 is a perspective view of an example vehicle wheel 10 including two annular components 12, 14 defining recesses 18A, 18B along an annular surface 16 defined by the two annular components 12, 14 when they are mechanically connected together. In the example shown in FIG. 1, vehicle wheel 10 also includes plates 20A, 20B and straps 26A, 26B across plates 20A, 20B. In some examples, however, vehicle wheel 10 may not include straps 26A, 26B, and, as discussed below, plates 20A, 20B may be held within recesses 18A, 18B using another suitable technique, such as by one or more bolts, one or more screws, other mechanical fixation mechanisms, or an adhesive.

Vehicle wheel 10 may be a demountable flange wheel. Annular component 12 may be referred to as an "inboard wheel half" or a "rim," and annular component 14 may be referred to as an "outboard wheel half" or a "demountable flange." For purposes of this disclosure, a "vehicle" may be an aircraft or a land vehicle such as an automobile. An "aircraft" as described and claimed herein may include any fixed-wing or rotary-wing aircraft or other type of flying device that includes one or more wheels for use, e.g., during ground maneuvers (e.g., taxiing, taking off, landing, and the like).

Annular component 12 is configured to mechanically connect to and align with annular component 14. Annular component 12 may be separable from annular component 14 such that, during maintenance of vehicle wheel 10, annular components 12, 14 may be pulled apart (and disconnected from each other) and reconnected without compromising the structural integrity of components 12, 14. When annular component 12 is mechanically connected to annular component 14 by one or more retaining ring portions (not shown in FIG. 1), annular components 12, 14 may be configured to receive a tire (not shown in FIG. 1) along radially outer surface 22 of annular components 12, 14. The one or more retaining ring portions may hold annular components 12, 14 together using a compressive force applied to radially outer surface 22 of annular component 14 by an inflated tire. Annular components 12, 14 may be aligned about axis of rotation 24 of vehicle wheel 10. Vehicle wheel 10 may rotate about axis of rotation 24 as vehicle wheel 10 rolls on a surface such as a road or a runway.

Annular components 12, 14 are configured to define recess 18 along annular surface 16 of annular components 12, 14. Annular surface 16 may be an exposed surface of vehicle wheel 10 that is substantially perpendicular (e.g., perpendicular or nearly perpendicular) to radially outer surface 22. In addition, annular surface 16 can be, for example, a ring-shaped surface that includes portions defined by both of annular components 12, 14. Vehicle wheel 10 may include a second annular surface on the backside of vehicle wheel 10 from the perspective of FIG. 1. When annular components 12, 14 are mechanically connected together, annular components 12, 14 may be aligned along annular surface 16 such that annular components 12, 14 define recess 18 (see FIG. 5). Annular surface 16 may be a common surface formed by both of annular components 12, 14. In some examples, annular surface 16 may be referred to as an "outboard annular surface," where the annular surface on the other side (not shown in FIG. 1) of vehicle wheel 10 may be an "inboard annular surface." In some examples, annular surface 16 is on a side of wheel 10 that is accessible to an operator after annular components 12, 14 have received a tire, such that plates 20A, 20B can be introduced in recesses 18A, 18B after annular components 12, 14 receive the tire.

Figure 6:
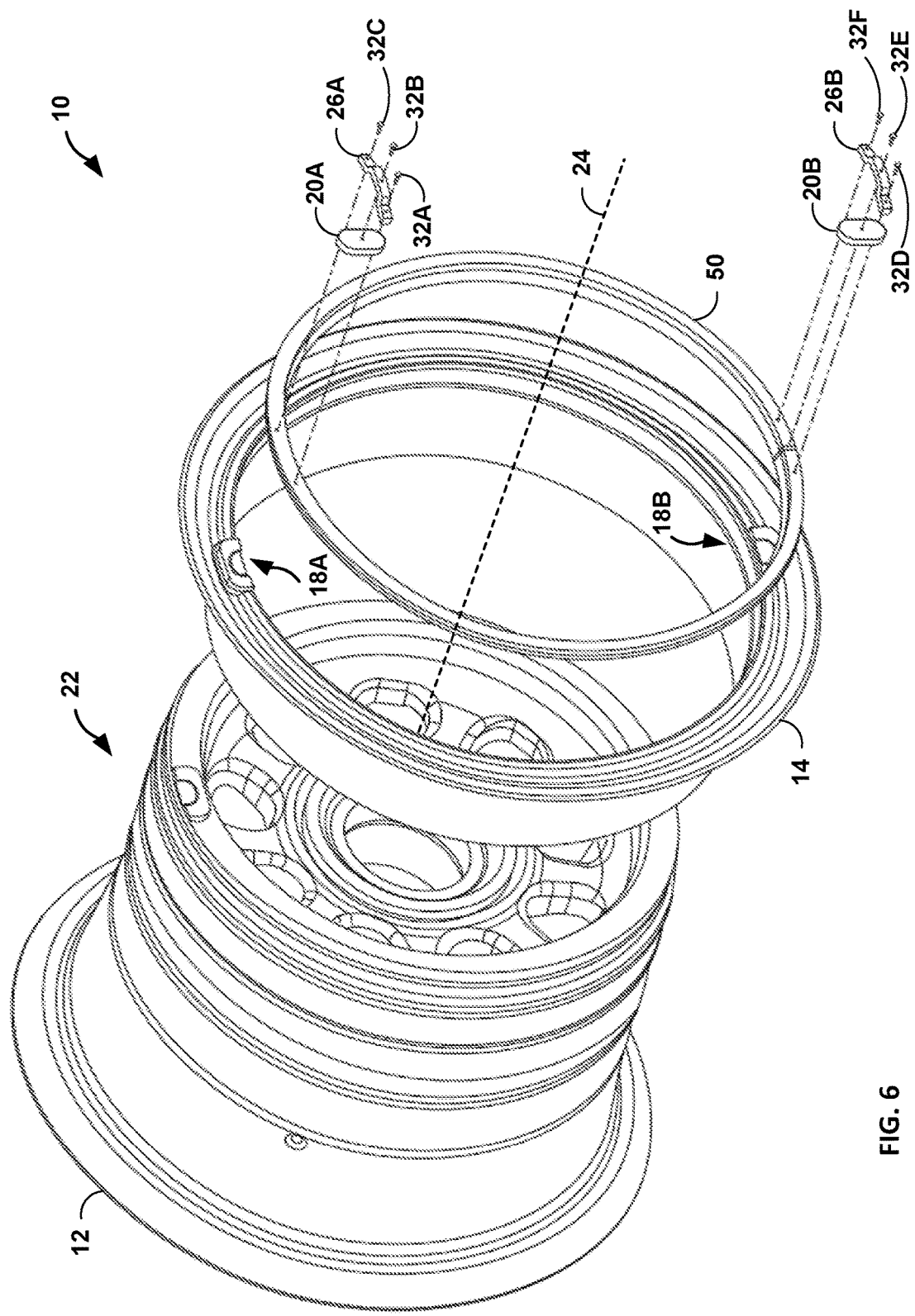
FIG. 6 is an exploded perspective view of an example vehicle wheel including two annular components defining two recesses along an annular surface of the two annular components.
Figure 9:
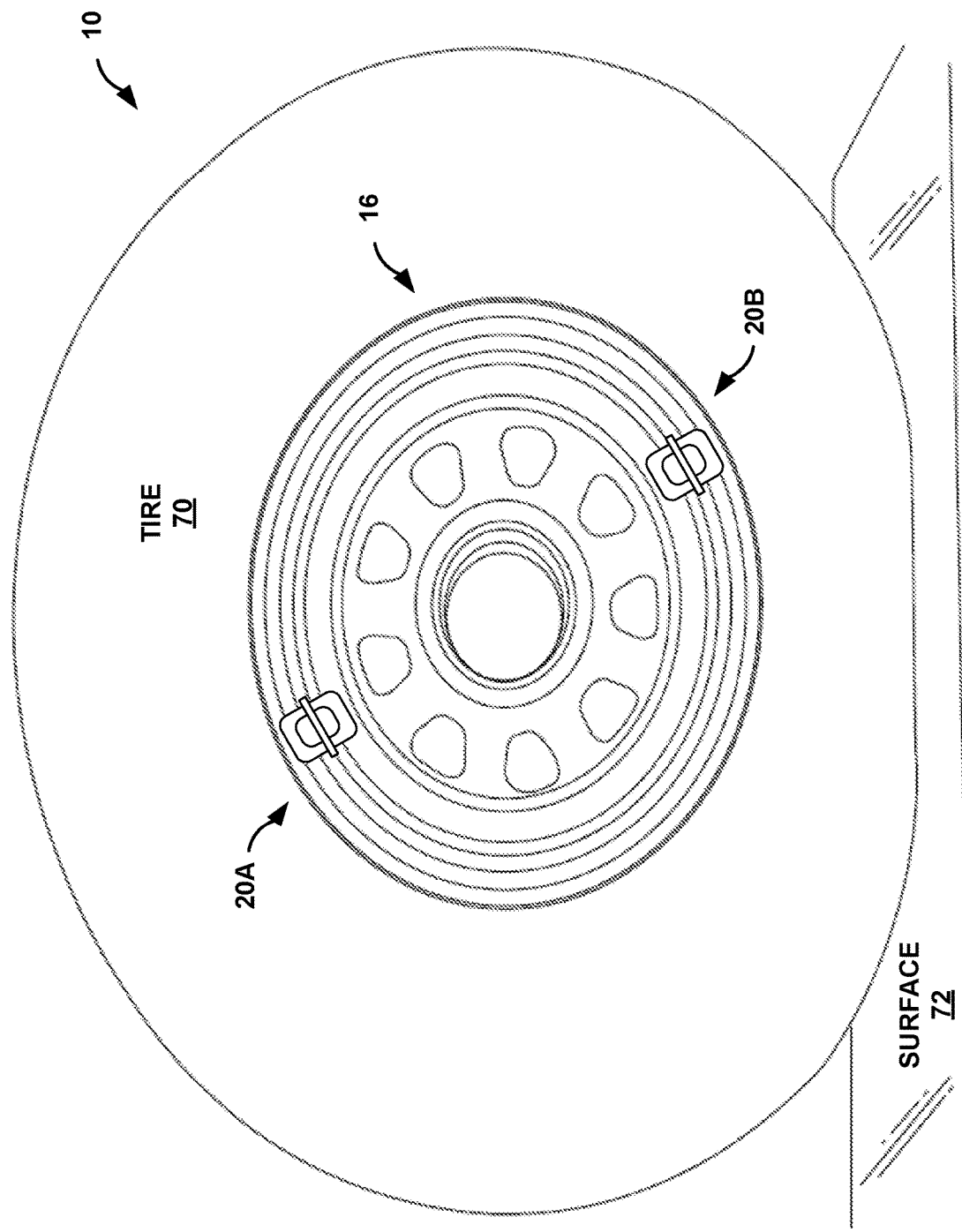
FIG. 9 is a side view of an example vehicle wheel including two plates to inhibit relative rotation between two annular components.

Recesses 18A, 18B are each located along annular surface 16 of annular components 12, 14. Although vehicle wheel 10 in FIGS. 1, 6, and 9 depict two recesses 18A, 18B, in other examples, wheel 10 may include a single recess 18 or more than two recesses. In some examples, vehicle wheel 10 may include any number of recesses 18, plates 20, and straps 26. Although recess 18A and plate 20A is primarily referred to below, the description of recess 18A also applies to recess 18B and plate 20B, respectively.

Recess 18A is configured to receive plate 20A. In some examples, each of annular components 12, 14 may include a receiving boss portion including a partial recess. When annular components 12, 14 are mechanically connected, the receiving boss portions and the partial recesses of annular components 12, 14, may align to define recess 18A. Recess 18A may include any suitable size and shape to receive plate 20A, such as a rectangle, a rounded rectangle, a circle, an oval, or a cross. In some examples, recess 18A and plate 20A may include complementary shapes such that plate 20A fits into recess 18A. In some examples, recess 18A may include larger dimensions than the dimensions of plate 20A so that plate 20A can move around in recess 18A both in plane and out of plane with annular surface 16. That is, plate 20A may include dimensions that are smaller than the dimensions of recess 18A such that recess 18A may receive plate 20A. In addition, in some examples, the depth of recess 18A may be larger than the thickness of plate 20A so that the exposed surface of plate 20A does not protrude further than the receiving boss portions of annular components 12, 14.

When plate 20A is received in recess 18A, plate 20A interacts with the surfaces of annular components 12, 14 defining recess 18A to inhibit relative rotation between annular components 12, 14 about axis of rotation 24 of vehicle wheel 10. Plate 20A may inhibit rotation between annular components 12, 14 by resisting rotational forces and compression loads applied to plate 20A by annular components 12, 14. This may help minimize tensile and shear loading into components adjacent to plate 20A, such as annular components 12, 14.

Other vehicle wheels may rely on only friction between two annular components of the vehicle wheel to inhibit relative rotation between the two annular components when the vehicle wheel is subjected to torque generated during certain events, such as wheel spin-up, acceleration, and/or braked rolling. However, a vehicle wheel may experience torque generated by ground forces that can exceed the opposing torque generated by friction between two annular components. During a simulation of braked roll for a vehicle wheel similar to vehicle wheel 10, the friction between the annular components defining the tire receiving surface generated only sixty-nine percent of the torque needed to prevent relative rotation between annular components for drag-to-vertical ratios exceeding thirty-two percent. Thus, vehicle wheel 10 may benefit from the ability of plate 20A to resist the rotational torque between annular components 12, 14 that may be caused by ground forces. Rotation between two annular components 12, 14 may shorten the life of one or more components of vehicle wheel 10, or may otherwise compromise the integrity of vehicle wheel 10. A vehicle wheel may be designed with increased friction between the two annular components to inhibit rotation, but increased friction may, in some examples, increase the wear and fretting between mating parts of a retaining ring and the two annular components.

Plate 20A may help address these issues, and may further inhibit relative rotation between annular components 12, 14 by resisting the torque applied to annular components 12, 14 during use of wheel 10. Thus, vehicle wheel 10 may wear slower (and therefore have a longer useful life) than a vehicle wheel that does not include plate 20A and/or otherwise experiences more relative rotation between two annular components. For example, vehicle wheel 10 may wear slower than a vehicle wheel that only relies on increased friction to resist rotation between two annular components. In some examples, vehicle wheel 10 may experience non-zero rotation between annular components 12, 14 even with plate 20A, but plate 20A may nevertheless still help inhibit the relative rotation.

In some cases, plate 20A may inhibit rotation between annular components 12, 14 better than, for example, tie bolts that mechanically connect annular components 12, 14 together. In addition, plate 20A may be easier to use than tie bolts. Bolting annular components 12, 14 together may include more than ten tie bolts. Using plate 20A to inhibit rotation may, in some examples, reduce the upfront costs, inventory costs, and maintenance costs, as compared to using tie bolts.

Plate 20 may be formed from any suitable material. The material may be selected to have the properties suitable for carrying the torque loads resulting from relative rotation of annular components 12, 14. For example, plate 20 may be formed from a material including aluminum. In some examples, the material for plate 20 may be selected such that plate 20 includes softer surfaces than the mating surfaces of receiving boss 30. In some examples, plate 20 may be cast or machined from bar stock metal.

Including two plates 20A, 20B to inhibit relative rotation of annular components 12, 14 may reduce the stress experienced by each plate of plates 20A, 20B. Including more than two plates may in vehicle wheel 10 may further reduce the stress experienced by each plate, but the cost and time of manufacturing and installing the plates may increase with each additional plate. In examples in which wheel 10 includes two plates, as shown in FIG. 1, the plates may have any suitable arrangement relative to each other. For example, plates 20A, 20B may be positioned on annular surface 16 of vehicle wheel 10 such that plates are diametrically opposed, as shown in FIG. 1. In this example, each of plates 20A, 20B may be separated by approximately one hundred and eighty degrees from the other plate of plates 20A, 20B. For purposes of this disclosure, "approximately one hundred eighty degrees" or "diametrically opposed" may include angles between one hundred and sixty degrees and two hundred degrees. In other examples, plates 20A, 20B may have another relative arrangement from each other, such as being unequally spaced about annular surface 16. For example, plates 20A, 20B may not be diametrically opposed on vehicle wheel 10.

Plates 20A, 20B may each be configured to fail before at least some other components of vehicle wheel 10, such as annular components 12, 14 fail. Therefore, plates 20A, 20B may function as a "sacrificial lamb" because the replacement of one or both plates 20A, 20B may be easier and less expensive than the replacement of other components of the vehicle wheel, such as annular components 12, 14. Because plates 20A, 20B may help minimize the stresses on annular components 12, 14 resulting from relative rotation, plates 20A, 20B may help elongate the useful of life of annular components 12, 14.

In some examples, plates 20A, 20B may each experience stresses that are below a failure threshold such that, if the plate is damaged or deformed, the plate may nonetheless operate to inhibit relative rotation between annular components 12, 14. For example, plate 20A may experience stress on the top-right corner and bottom-left corner of plate 20, as viewed from the perspective of FIG. 3. The top-right corner and bottom-left corner of plate 20A may experience deformation or failure due to these stresses. If the deformation experienced by plate 20A is non-fatal, a mechanic may remove and reinsert plate 20A into recess 18A such that the top-right corner and bottom-left corner of plate 20A are in the top-left corner wall and bottom-right corner wall of recess 18A. As a result, the effective life of plate 20A may be increased by flipping plate 20A.

Plate 20A is depicted in FIG. 1 as having a symmetrical shape. In some examples, plate 20A may have any suitable shape, including asymmetrical shapes. However, if plate 20A has a symmetrical shape, it may be easier to rotate plate 20A within recess 18A during maintenance, as compared to a plate with an asymmetrical shape. When the load-bearing surfaces of plate 20A are worn, plate 20A can be flipped rather than replacing plate 20A. Flipping plate 20A may cause each of the corner walls of plate 20A to experience load-bearing stress during the life of plate 20A, rather than two corner walls bearing all of the loads from annular components 12, 14. A symmetrical shape may also make plate 20A easier to manufacture and install.

Plate 20A is secured within recess 18A, such that during operation of wheel 10, plate 20A remains within recess 18A. In some examples, plate 20A is removably secured within recess 18A, such that after an initial installation of plate 20A in recess 18A and, e.g., after some use of wheel 10, plate 20A may be removed from recess 18A without compromising the structural integrity of annular components 12, 14, and, in some cases, without compromising the structural integrity of plate 20A. For example, during use of wheel 10, plate 20A may wear, and so it may be desirable to remove plate 20A from recess 18A in order to flip plate 20A over to get more use out of plate 20A, to replace plate 20A, or to repair plate 20A. There may be other reasons for separating plate 20A from recess 18A.

Plate 20A may be secured within recess 18A such that plate 20A may move within recess 18A, as discussed in further detail below. Plate 20A may, for example, be secured within recess 18A so that it does not fall out of recess 18A during use of wheel 10, but is still able to move within six degrees of freedom relative to annular components 12, 14. In other examples, plate 20A may, for example, be secured within recess 18A so that it has fewer degrees of freedom of movement, such as two (in-plane or out-of-plate) or four degrees (in-plane and out-of-plane).

Plate 20A may be secured within recess 18A using any suitable technique. In some examples, vehicle wheel 10 includes strap 26A, 26B (collectively referred to as "straps 26"), which are each configured to hold the respective plate 20A, 20B in the respective recess 18A, 18B. Straps 26 may be connected to the respective plate 20A, 20B and/or another component of vehicle wheel 10 such as one or more retaining ring portions (not shown in FIG. 1) using any suitable technique, such as via an attachment element (e.g., a bolt or a rivet). Each plate 20A, 20B may be positioned between base surface 40 of the respective recess 18A, 18B and the respective strap 26A, 26B (see FIG. 3). Straps 26A, 26B may be positioned to allow the respective plate 20A, 20B to move in an out-of-plane direction between the respective base surface 40 and strap 26A, 26B. In addition, each strap 26A, 26B may be positioned close enough to the base surface 40 of the respective recess 18A, 18B to prevent the respective plate 20A, 20B from dislodging from the recess 18A, 18B.

Straps 26A, 26B may be formed from any suitable material that is configured to withstand the forces applied to the strap from holding the respective plate 20A, 20B in the recess. In some examples, straps 26A, 26B are each formed from stainless steel or any other suitable material and may include dimensions that are sufficient to prevent each plate 20A, 20B from dislodging from the respective recess 18A, 18B. Straps 26A, 26B may be long enough to extend across each plate 20A, 20B and attach to a retaining ring portion on each side of each plate 20A, 20B.

Figure 2:
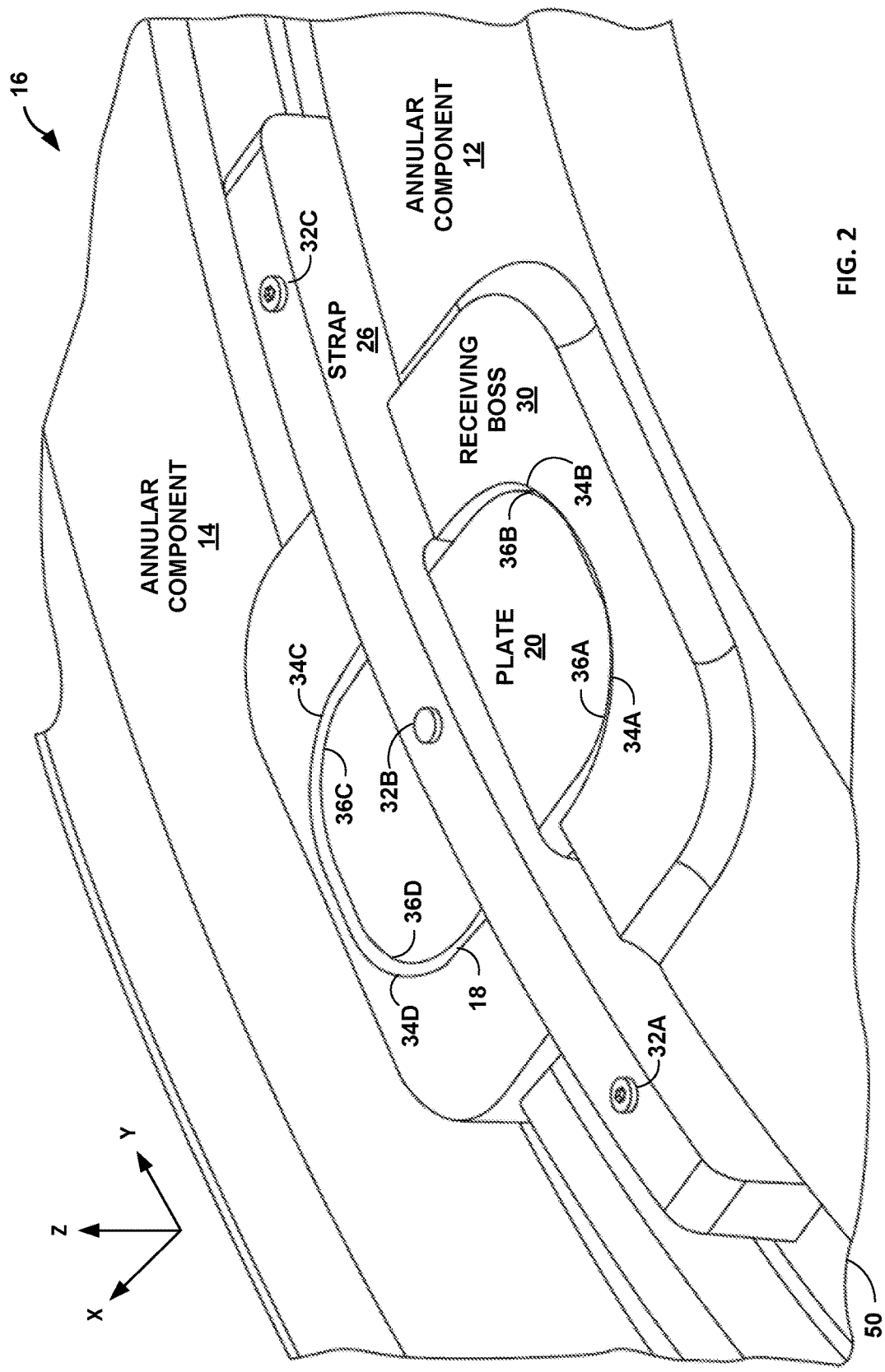
FIG. 2 is a perspective view of an example plate in a recess defined by two annular components of a vehicle wheel, where the vehicle wheel includes a strap that is attached to the plate.

FIG. 2 is a perspective view of an example plate 20 in a recess 18 defined by two annular components 12, 14 of a vehicle wheel 10, where the vehicle wheel 20 further includes a strap 26 that is attached to the plate 20. Plate 20 may be, for example, plate 20A or 20B shown in FIG. 1, recess 18 may be recess 18A or 18B shown in FIG. 1, and strap 26 may be strap 26A or 26B shown in FIG. 1. As depicted in FIG. 2, recess 18 and plate 20 include a rectangle shape with rounded corners, but recess 18 and plate 20 may include any suitable dimensions and shape in other examples. Also shown in FIG. 2 are receiving boss 30, attachment elements 32A-32C, and retaining ring 50. In some examples, receiving boss 30 may include a first portion formed on annular component 12 and a second portion formed on annular component 14. In some examples, retaining ring 50 may include a first portion attached to strap 26 by attachment element 32A and a second portion attached to strap 26 by attachment element 32C. The two portions of retaining ring 50 may come together underneath plate 20.

Recess 18 may include base surface 40 (shown in FIGS. 3 and 4) that is approximately parallel to annular surface 16 of vehicle wheel 10. For purposes of this disclosure, base surface 40 of recess 18 may be approximately parallel to annular surface 16 if the difference in orientation between the planes of the two surfaces is less than twenty degrees. Base surface 40 may be flat or otherwise configured to have a complementary shape (e.g., curvilinear, stepped, and the like) to a surface of plate 20 intended to rest on base surface 40. In other examples, base surface 40 may include another suitable orientation relative to annular surface 16. In these examples, however, base surface 40 may not be parallel to annular surface 16. Base surface 40 may include a first portion of receiving boss 30 formed on annular component 12 and a second portion of receiving boss 30 formed on annular component 14. In some cases, in response to vertical and side loads, the second portion of base surface 40 may cant or bend, causing the angle of the second portion of base surface 40 to change relative to the angle of the first portion of base surface 40.

In some examples, retaining ring 50 may protrude farther in the z-axis direction than base surface 40 such that plate 20 contacts retaining ring 50 when introduced to recess 18. This configuration of retaining ring 50 may define a gap between plate 20 and surface 40 when plate 20 is introduced in recess 18 and is in a resting state (in the absence of forces resulting from relative rotation of annular components 12, 14). This gap between plate 20 and surface 40 may help prevent cocking of plate 20 (e.g., a non-parallel orientation relative to what would be a planar surface 40) within recess 18 when plate 20 is at the resting state. In some examples, due to tolerances in annular components 12, 14, the portion of annular component 12 defining a part of surface 40 and the portion of annular component 14 defining the other part of surface 40 may not align to define a planar surface 40. If plate 20 is resting on such an uneven surface, plate 20 may sit at an angle within recess 18 (relative to what would be a planar surface 40), which may adversely affect the performance or useful life of plate 20 once plate 20 starts moving within recess 18 in response to relative movement between components 12, 14. In this way, the gap between plate 20 and surface 40 resulting from a protruding retaining ring 50 may provide advantages in some examples.

In some examples, recess 18 may include a depth that is greater than the thickness of plate 20 so that plate 20 does not protrude out of recess 18. Corner walls 34A-34D of recess 18 may provide out-of-plane contact surfaces for the thickness of corner walls 36A-36D of plate 20 if the depth of recess 18 is greater than the thickness of plate 20. The depth of recess 18 may be measured in the z-axis direction from base surface 40 of recess 18 to the annular surface of receiving boss 30. Recess 18 may include a length in the x-axis direction and a width in the y-axis direction that is greater than the length and width of plate 20 so that plate 20 may move or shift within recess 18.

Recess 18, plate 20, and strap 26 may be designed to reduce the tensile stress and shear loading on attachment elements 32A-32C. Plate 20 and recess 18 may be configured such that plate 20 contacts base surface 40 of recess 18 when plate 20 is disposed within recess 18. For example, plate 20 may be positioned on base surface 40 and held in place by strap 26, base surface 40, and corner walls 34A-34D of recess 18. In some examples, plate 20 may contact retaining ring 50 if retaining ring 50 protrudes farther than base surface 40 in the z-axis direction. Plate 20 may be configured to carry the torsional and compressive loads caused by relative rotation of annular components 12, 14, thereby reducing the amount of torque loads applied to annular components 12, 14. For example, under torsional stress resulting from relative rotation of annular components 12, 14, plate 20 may be configured to rotate within recess 18 such that corners of plate 20 that are diagonal from each other to contact corner walls 34A-34D of recess 18. As an example, plate 20 may contact top-right corner wall 34C of recess 18 and bottom-left corner wall 34A of recess 18.

In some examples, recess 18 may be defined by receiving boss 30, which may be include a portion of annular component 12 and a portion of annular component 14. In some examples, receiving boss 30 may extend or otherwise protrude outwards from annular surface 16 of annular components 12, 14. The interior walls of receiving boss 30, e.g., the corner walls 34A-34D of recess 18, may define recess 18, including top-right corner wall 34C and bottom-left corner wall 34A.

Receiving boss 30 defines the surfaces that interact with plate 20 and, therefore, may be subjected to some stresses from movement of plate 20 within recess 18. Some or all of receiving boss 30 may therefore, in some examples, be provided with a surface treatment or coating to help improve the performance of vehicle wheel 10 and/or plate 20. For example, receiving boss 30, including corner walls 34A-34D and base surface 40 of recess 18, may include a lubricating coating or treatment, a hardening coating or treatment, or both the lubricating coating or treatment and hardening coating or treatment. For example, the coating or treatment of receiving boss 30 may include a lubricating surface treatment (e.g., a polytetrafluoroethylene (PTFE) coatings or a surface treatment that reduces the friction of the surfaces defining recess 18), cold working, roll burnishing, and/or any other suitable coating or treatment. A lubricating coating or surface treatment may help reduce the wear on plate 20 and annular components 12, 14 by reducing the relative friction between plate 20 and annular components 12, 14. In addition, a hardening coating or surface treatment may help increase the useful life of annular components 12, 14 by strengthening the portions of annular components 12, 14 that interact with plate 20.

In some examples, receiving boss 30 may be an integral part of annular components 12, 14, or receiving boss 30 may be a separate component or a separate feature that is mechanically attached to annular components 12, 14. Receiving boss 30 may wear down due to the forces experienced by receiving boss 30, which may lead to the replacement of receiving boss 30. In some cases, it may be more cost efficient, time efficient, or both, to replace receiving boss 30 in examples in which receiving boss 30 is a separate component. In addition, in some cases, applying coatings to receiving boss 30 may also be easier if receiving boss 30 is a separate component, e.g., the coating may be applied to receiving boss 30 before attaching it to annular components 12, 14, which may eliminate the need to mask or otherwise prevent part of components 12, 14 during the application of the one or more coatings.

Strap 26 may be configured to hold plate 20 in recess 18 by attaching to plate 20 by attachment element 32B and attaching to retaining ring 50 by attachment elements 32A, 32C. In some examples, strap 26 may attach to plate 20 and retaining ring 50 by any number of attachment elements. Each of attachment elements 32A, 32C may include a bolt or any other suitable element, and attachment element 32B may include a rivet, a bolt, or any other suitable element. Each of plate 20 and strap 26 may include a material (e.g., a metallic material) that provides strength and resistance to torsional forces. In some examples, strap 26 may include stainless steel and may be machined from bar stock metal.

Strap 26 may be configured to allow plate 20 to move freely within recess 18 until one or more of corner walls 36A-36D of plate 20 contacts corner walls 34A-34D of receiving boss 30 that define recess 18 and/or contact strap 26. For example, strap 26 may be loosely mechanically attached to plate 20 to allow plate 20 to move between strap 26 and base surface 40 of recess 18. This out-of-plane movement of plate 20 relative to strap 26 may increase the contact surface area between plate 20 and strap 26. Increased contact surface area between plate 20 and strap 26 may reduce the peak stresses on plate 20 and strap 26 and potentially extend the life of plate 20 and strap 26. For purposes of this disclosure, "out-of-plane movement" may refer to movement that is perpendicular to annular surface 16.

Retaining ring 50 may include a single retaining ring portion or two retaining ring portions that meet underneath plate 20. For examples where retaining ring 50 includes two portions, strap 26 may connect to the first portion of retaining ring 50 by attachment element 32A and may connect to the second portion of retaining ring 50 by attachment element 32C. Thus, in some examples, strap 26 may hold two portions of retaining ring 50 together through attachment elements 32A, 32C.

Retaining ring 50 may be configured to inhibit annular component 14 from moving axially relative to annular component 12 along the axis of rotation of vehicle wheel 10. Retaining ring 50 may be positioned between annular components 12, 14. Annular component 12 may press against retaining ring 50 when annular components 12, 14 have received an inflated tire. When annular component 12 presses against retaining ring 50, retaining ring 50 may inhibit annular component 12 from separating from annular component 14. Retaining ring 50 may include aluminum and/or any other suitable material and may define holes configured to receive attachment elements 32A, 32C. In some examples, retaining ring 50 may include two portions that are each connected to strap 26, where each portion of retaining ring 50 is a retaining ring half.

Figure 3:
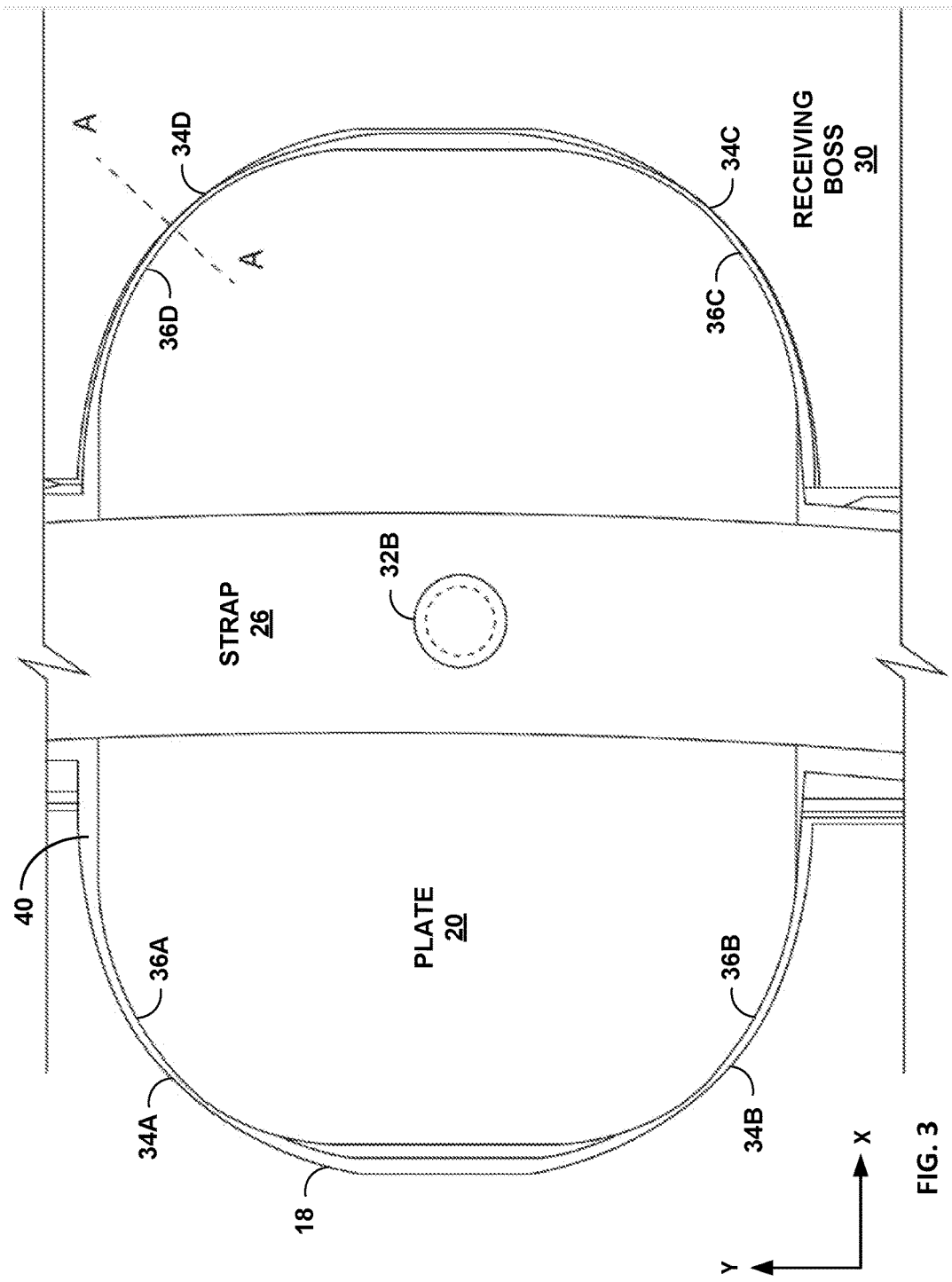
FIG. 3 is a top view of an example plate positioned in a recess, where the plate includes a rectangular shape with rounded corners.

FIG. 3 is a top view of an example plate 20 positioned in a recess 18, where the plate 20 includes a rectangular shape with rounded corner walls 36A-36D. The rounded rectangular shape of plate 20 may be defined by the rounded rectangular outer perimeter, from the perspective of FIG. 3, which includes corner walls 36A-36D. In some examples, corner walls 36A-36D may be defined by compound radii such that corner walls 36A-36D of plate 20 feather away from corner walls 34A-34D of recess 18. The compound radii of corner walls 36A-36D may minimize the peak stresses applied to at the perimeter of contact between plate 20 and the surfaces of recess 18, thereby minimizing the stress applied to plate 20 by distributing the forces on plate 20. Thus, the curvature of corner walls 36A-36D may reduce the peak stress experienced at any point on plate 20.

As discussed above, in some examples, recess 18 has a shape that complements a shape of plate 20, such that plate 20 may be received in recess 18 and engage with the walls of recess 18. In the example shown in FIG. 3, recess 18 may also include a rectangular shape with rounded corners. The curvature of corner walls 36A-36D of plate 20 may distribute the forces applied by receiving boss 30 to plate 20 across a relatively large surface area of plate 20, as compared to a rectangular shape with sharp corners. The shapes of recess 18 and plate 20 in FIG. 3 may be referred to as a "racetrack shape" or "sardine can shape."

The dimensions of plate 20 may depend on the type of vehicle and the size of the vehicle wheel. In some examples, the longest dimension of plate 20 may be greater than two centimeters and less than six centimeters. The longest dimension of example plate 20 may be measured in the x-axis direction (orthogonal x-y axes are shown in FIG. 3 for ease of description of the figures only) from one edge of plate 20 to an opposite edge of plate 20. The dimension measured in the y-axis direction across plate 20 on FIG. 3 may be greater than one centimeter and less than four centimeters. The thickness of plate 20 measured in the z-axis direction (see FIG. 4) from the surface of plate 20 that is closest to strap 26 to the surface of plate 20 that is closest to base surface 40 of recess 18 may be less than three centimeters.

Figure 4:
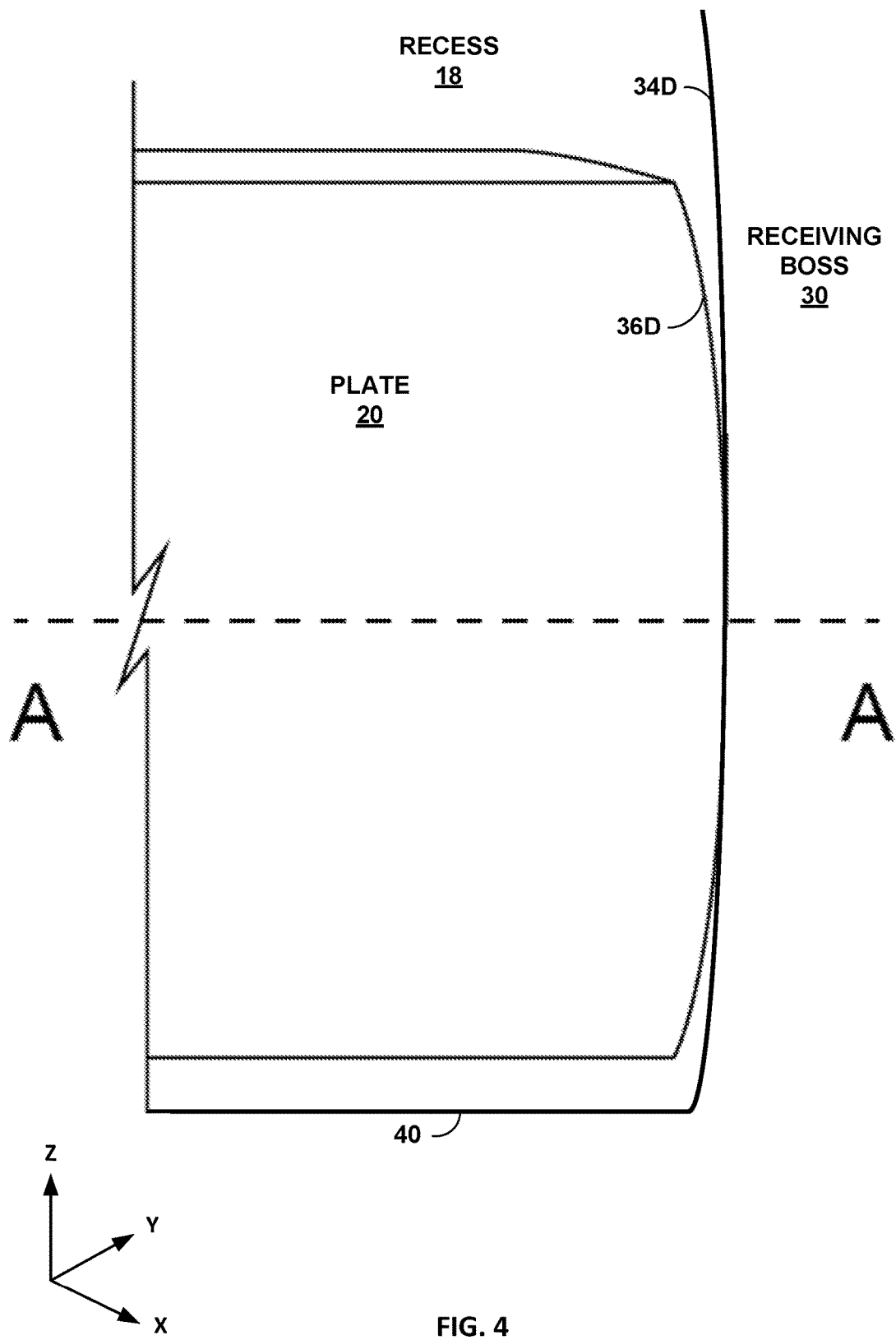
FIG. 4 is a perspective view of an example plate and a receiving boss, which may be formed on an annular component, where the plate includes curved contact surfaces.

FIG. 4 is a perspective view of an example plate 20 and a receiving boss 30, and illustrates a schematic cross-sectional view of plate 20 and receiving boss 30 taken along line A-A in FIG. 3. As discussed above, when annular components 12, 14 are mechanically connected, the interior walls of the two portions of receiving boss 30 may form recess 18. In the example shown in FIG. 4, plate 20 is depicted as contacting top-right corner wall 34D of recess 18. Plate 20 may include curved contact surfaces on some or all of the sides of plate 20. Receiving boss 30 may also include a curved contact surface with a larger radius than the radius of curvature of plate 20. The portion of annular component 14 may include a portion of receiving boss 30 that defines recess 18.

The curved contact surface of plate 20 may distribute the force applied by the portion of annular component 14. For example, the curved contact surface of plate 20 may be configured to help distribute the Hertzian contact stresses. In some examples, primary (in-plane relative to base surface 40) and secondary (out-of-plane relative to base surface 40) radii may be designed to produce low and smoothly distributed contact stresses on plate 20 and receiving boss 30. FIG. 3 depicts the primary radii of corner walls 34A-34D and corner walls 36A-36D that are in-plane with annular surface 16. FIG. 4 depicts the secondary radii of plate 20 and receiving boss 30 that are out-of-plane with annular surface 16. The out-of-plane curvature of plate 20 may distribute the Hertzian contact stress imparted by corner wall 34D of receiving boss 30. Out-of-plane features may extend in the z-axis direction, and in-plane features may extend in the x-axis direction and/or y-axis direction.

Figure 5:
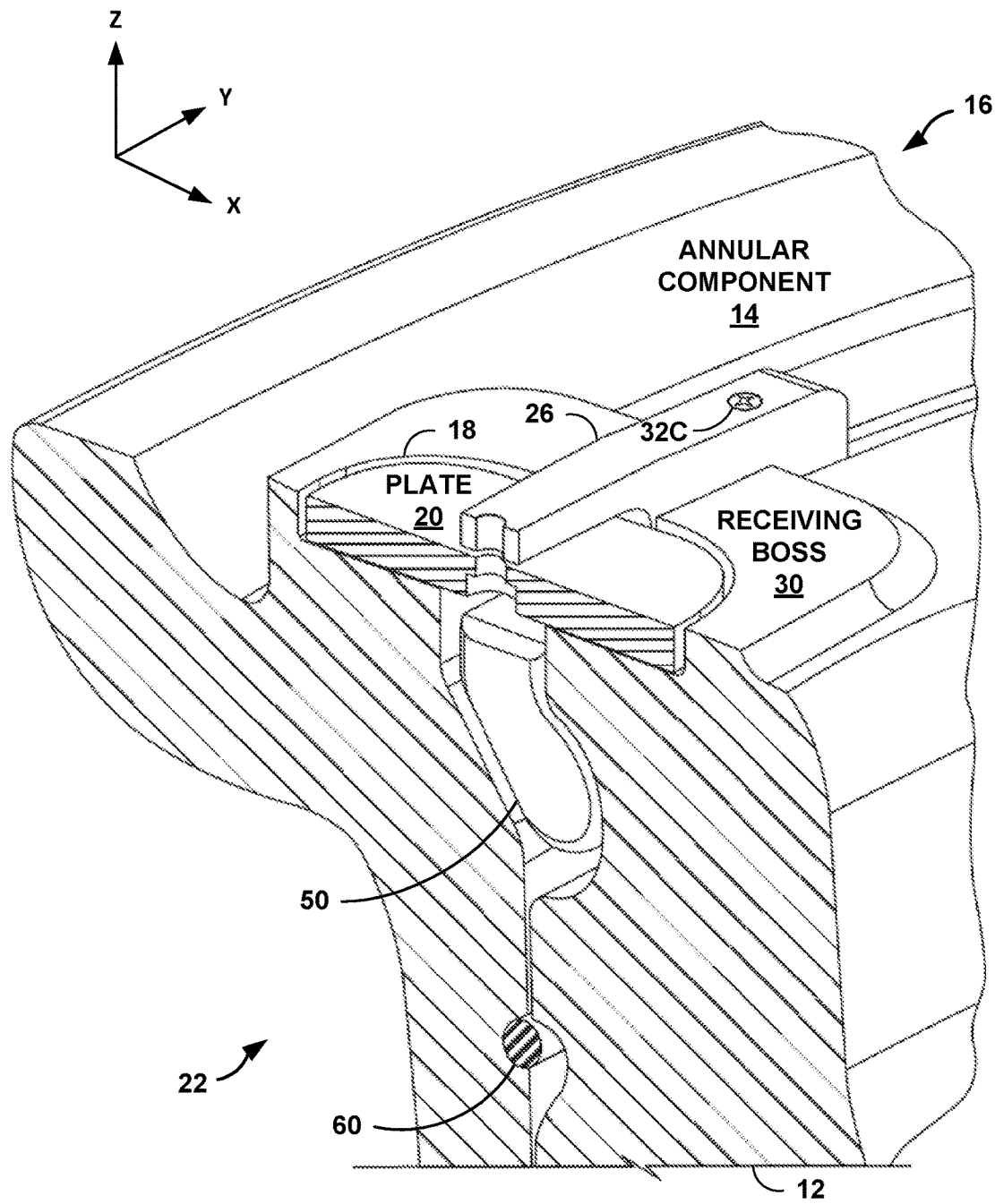
FIG. 5 is a cut-away view of an example vehicle wheel including two annular components, a retaining ring, and an O-ring.

FIG. 5 is a cut-away view of vehicle wheel 10 including two annular components 12, 14, a retaining ring 50, and an O-ring 60. Plate 20 may be positioned in recess 18 to inhibit relative rotation between annular components 12, 14.

Retaining ring 50 may be positioned between annular components 12, 14 and may include two portions that meet at a position on vehicle wheel 10 that is near or underneath plate 20. Retaining ring 50 may be configured to hold annular components 12, 14 together when annular components 12, 14 have received a tire (not shown in FIG. 5) along a radially outer surface of vehicle wheel. Retaining ring 50 may be positioned behind or underneath plate 20, as viewed from annular surface 16. In some examples, retaining ring 50 may include two or more portions that are linked together by strap 26. Plate 20 may be configured to attach to retaining ring 50 by at least attachment element 32C. Plate 20 may also attach to a portion of retaining ring 50 by attachment element 32A (not shown in FIG. 5).

In some examples, O-ring 60 is configured to seal the gap between annular components 12, 14. When annular components 12, 14 have received a tire at radially outer surface 22, in some examples, O-ring 60 impedes the movement of fluid from the tire through the gap between annular components 12, 14 to annular surface 16.

FIG. 6 is an exploded perspective view of vehicle wheel 10 of FIG. 1. Annular component 12 is configured to be separable from annular component 14, as shown in FIG. 6. When annular components 12, 14 are mechanically connected, annular components 12, 14 may define recesses 18A, 18B along annular surface 16, where recesses 18A, 18B are configured to receive plates 20A, 20B.

Figure 7:
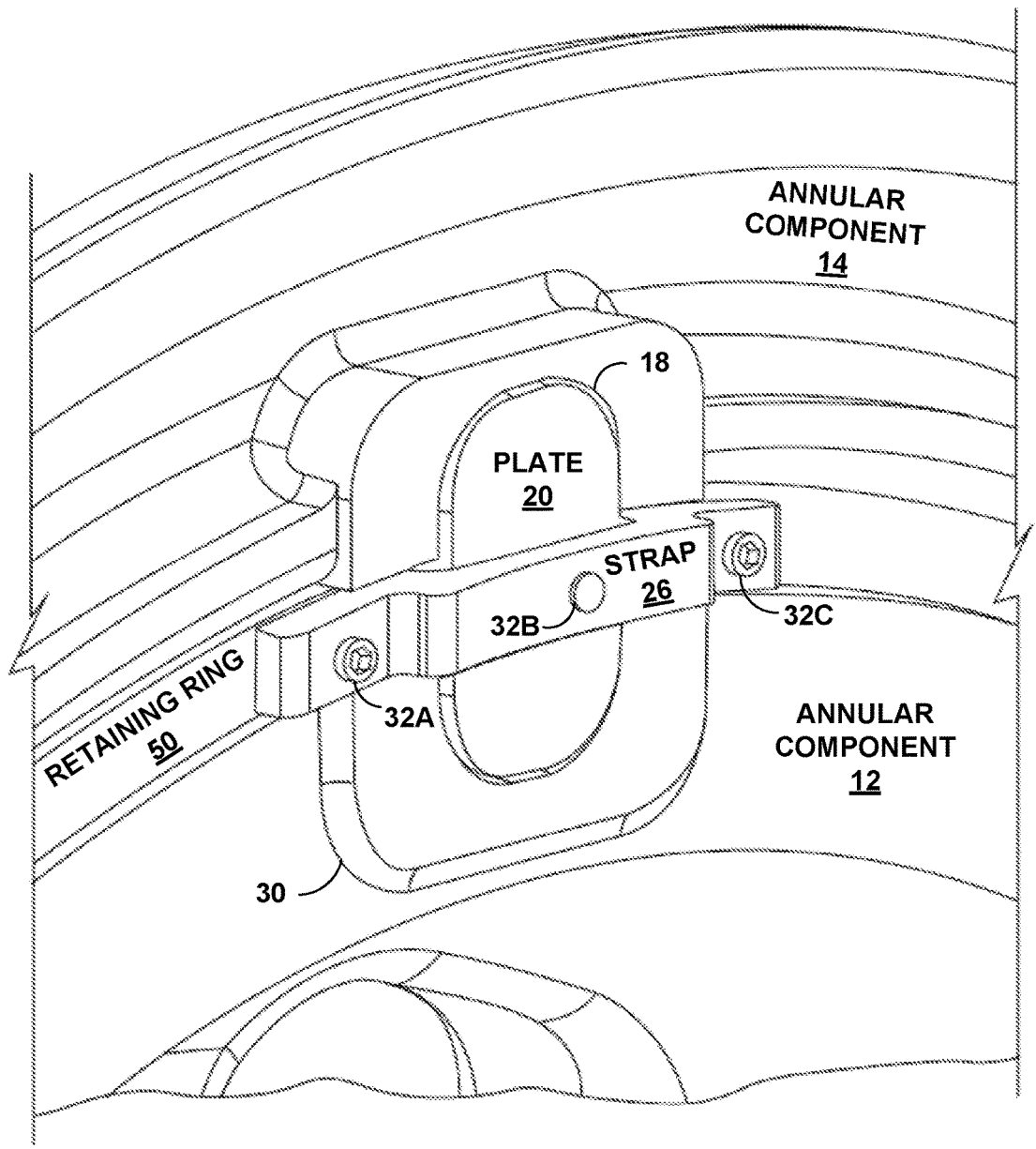
FIG. 7 is a close-up perspective view of an example plate in a recess defined by two annular components of a vehicle wheel.

FIG. 7 is a close-up perspective view of plate 20 in a recess 18 defined by two annular components 12, 14 of a vehicle wheel 10. Annular components 12, 14 may include receiving boss 30 that forms recess 18, where recess 18 is configured to receive plate 20. FIG. 7 depicts attachment elements 32A, 32C as connecting strap 26 to retaining ring 50 and attachment element 32B as connecting strap 26 to plate 20. In some examples, vehicle wheel 10 may include more or fewer attachment elements for connecting strap 26 to retaining ring 50 and more or fewer attachment elements for connecting strap 26 to plate 20.

Figure 8:
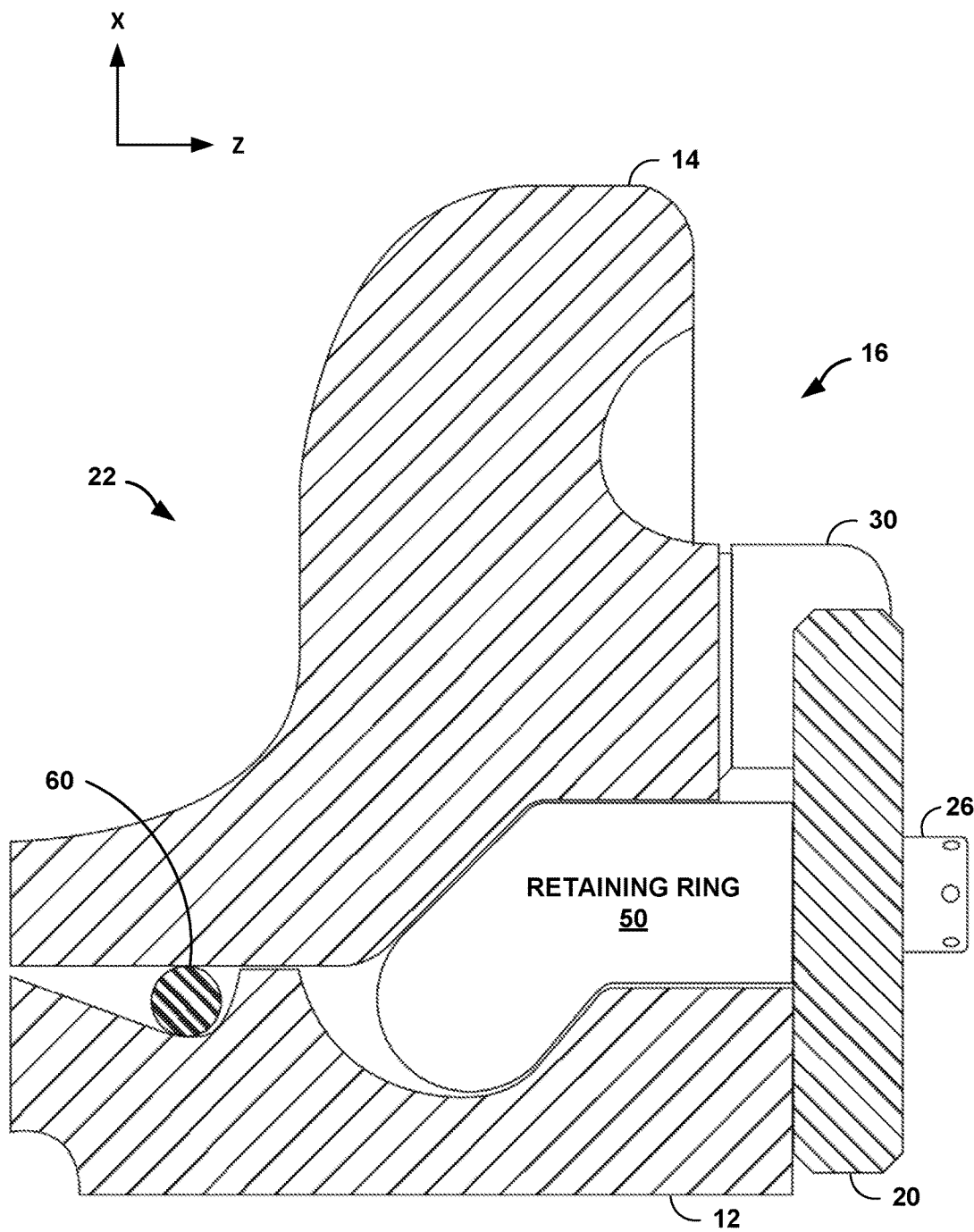
FIG. 8 is a cut-away side view of an example vehicle wheel including two annular components, a retaining ring, and an O-ring.

FIG. 8 is a cut-away side view of vehicle wheel 10 and illustrates cross-sectional views of annular components 12, 14 (including receiving boss 30), plate 20, strap 26, retaining ring 50, and O-ring 60. Plate 20 may be secured in place by strap 26 and receiving boss 30, which may protrude from annular component 14. As shown in FIG. 8, plate 20 is axially outward (relative to an axis of rotation of wheel 10) of retaining ring 50. FIG. 8 depicts plate 20 as extending past to the annular surface of receiving boss 30 in the z-axis direction, which may occur in some examples of vehicle wheel 10.

FIG. 9 is a side view of vehicle wheel 10 and tire 70 mounted on vehicle wheel 10. When annular components 12, 14 are mechanically connected, annular components 12, 14 may be configured to receive tire 70. Tire 70 may contact surface 72 and support all or a portion of the weight of a vehicle.

In some examples, a vehicle wheel may include a plate held in place by one or more attachment elements other than a strap. The one or more attachment elements may connect the plate to one or more portions of a retaining ring. The vehicle wheel may not necessarily include a strap configured to hold the plate in place in a recess.

Figure 10:
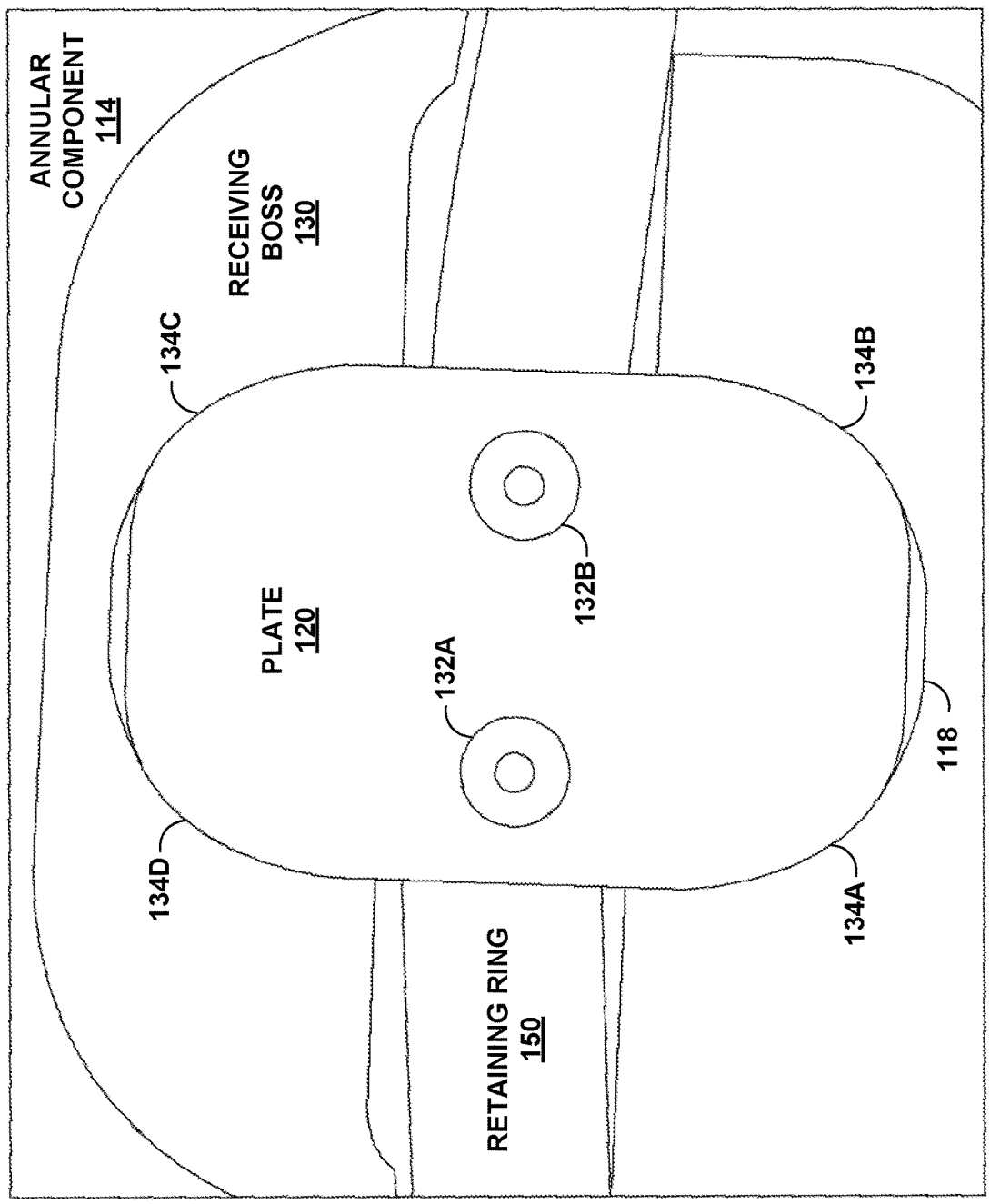
FIG. 10 is a top view of an example plate positioned in a recess, where the plate is secured to a retaining ring by two attachment elements.

FIG. 10 is a top view of an example plate 120 positioned in a recess 118, where the plate 120 is secured to a retaining ring 150 by two attachment elements 132A, 132B. Plate 120 is configured to inhibit relative rotation between annular components 112, 114 about the axis of rotation of a vehicle wheel. As plate 120 inhibits relative rotation between annular components 112, 114, plate 120 may experience compressive and torsional stresses due to being pushed by annular components 112, 114.

Figure 11:
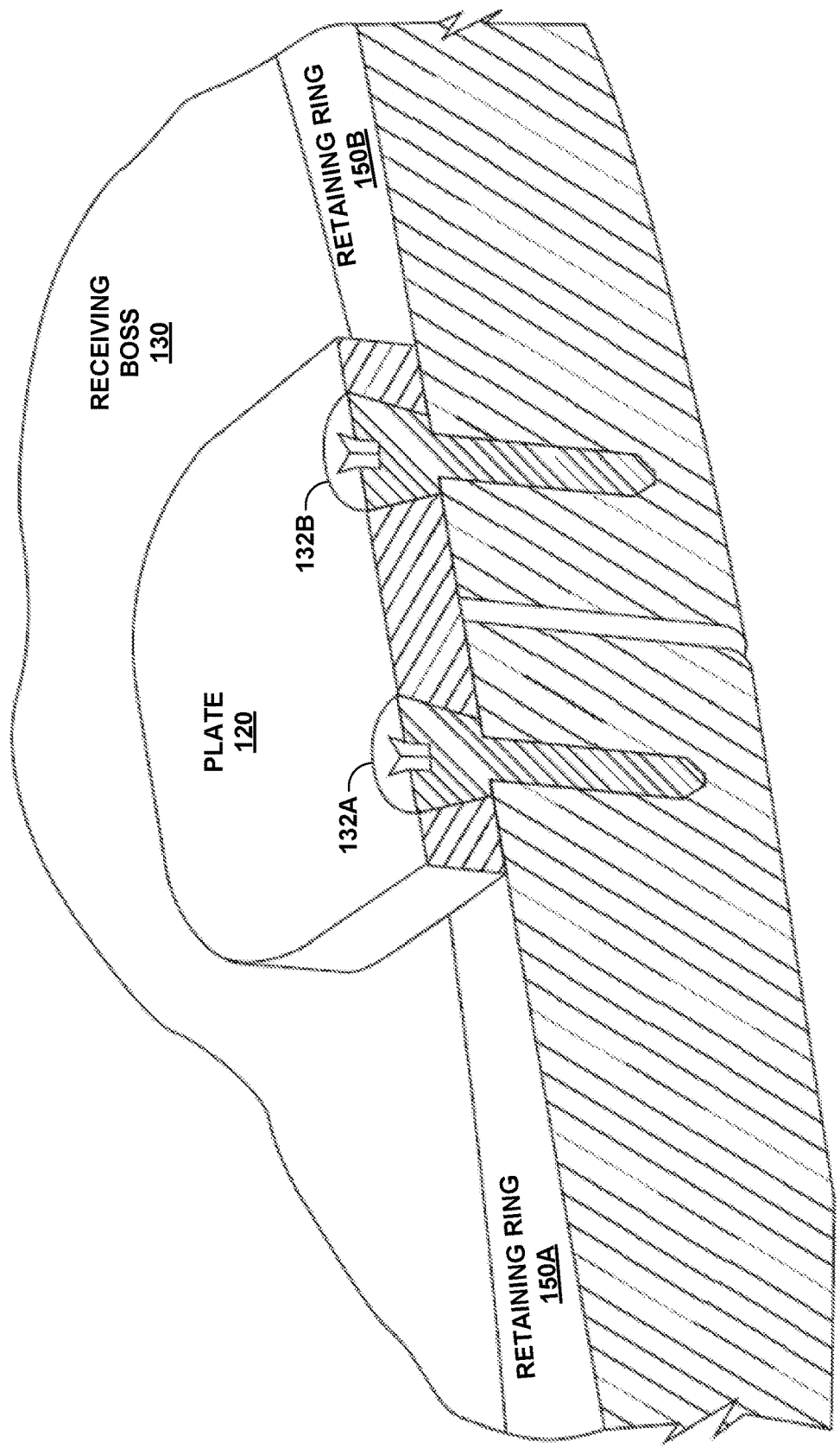
FIG. 11 is a cut-away perspective view of an example plate, where the plate is secured to two retaining ring portions by two attachment elements.

FIG. 11 is a cut-away perspective view of plate 120, where the plate 120 is secured to two retaining ring portions 150A, 150B by two attachment elements 132A, 132B. Each of retaining ring portions 150A, 150B may extend halfway around a vehicle wheel. Each of retaining ring portions 150A, 150B may be positioned between two annular components of the vehicle wheel. In some examples, each of retaining ring portions 150A, 150B may meet underneath plate 120 such that attachment element 132A connects plate 120 to retaining ring portion 150A and attachment element 132B connects plate 120 to retaining ring portion 150B. Attachment elements 132A, 132B may be tapered to reduce the bending stresses experienced by attachment elements 132A, 132B.

Figure 12:
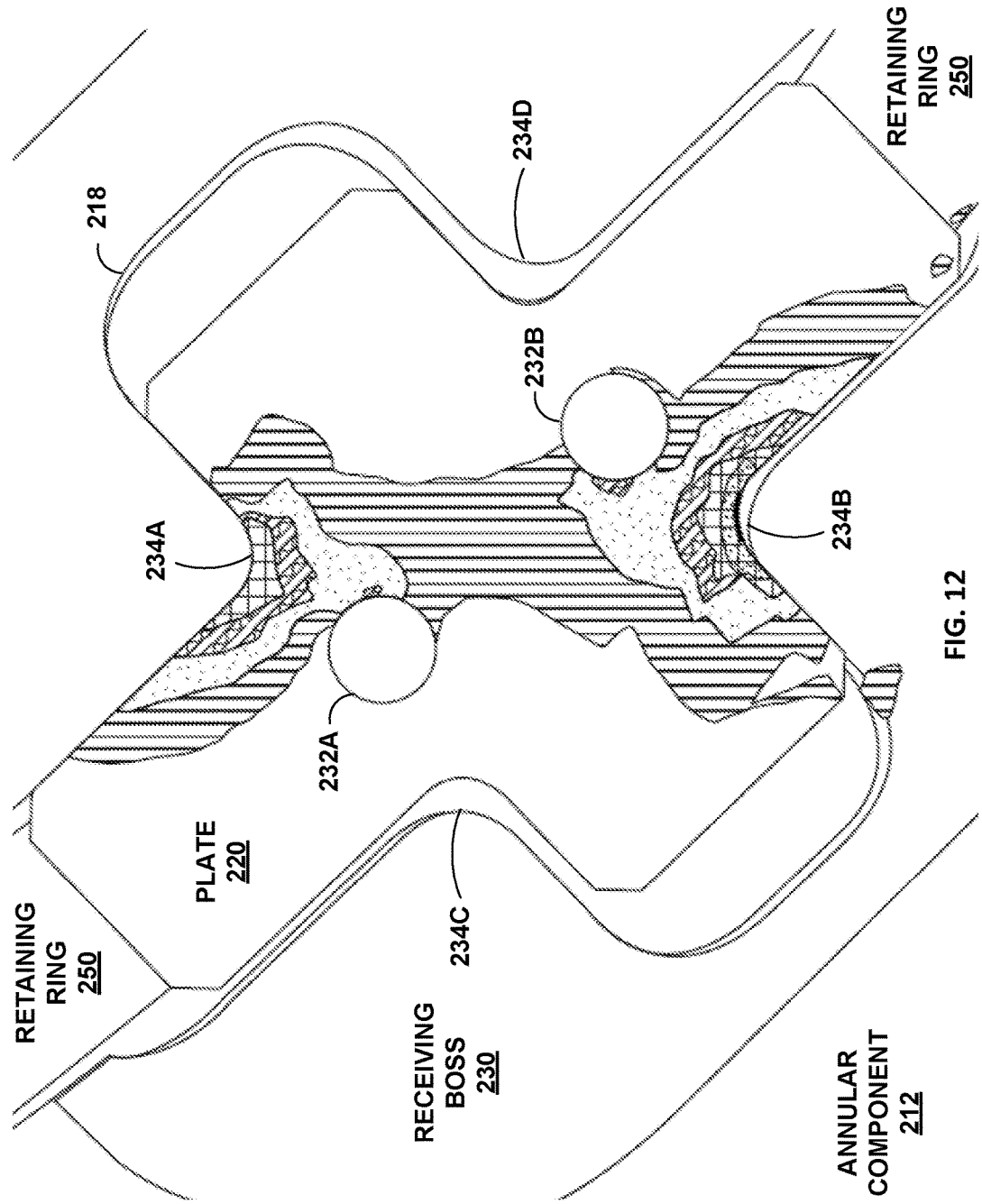
FIG. 12 is a top view of an example plate positioned in a recess, where the plate is secured to a retaining ring by two attachment elements.
Figure 13:
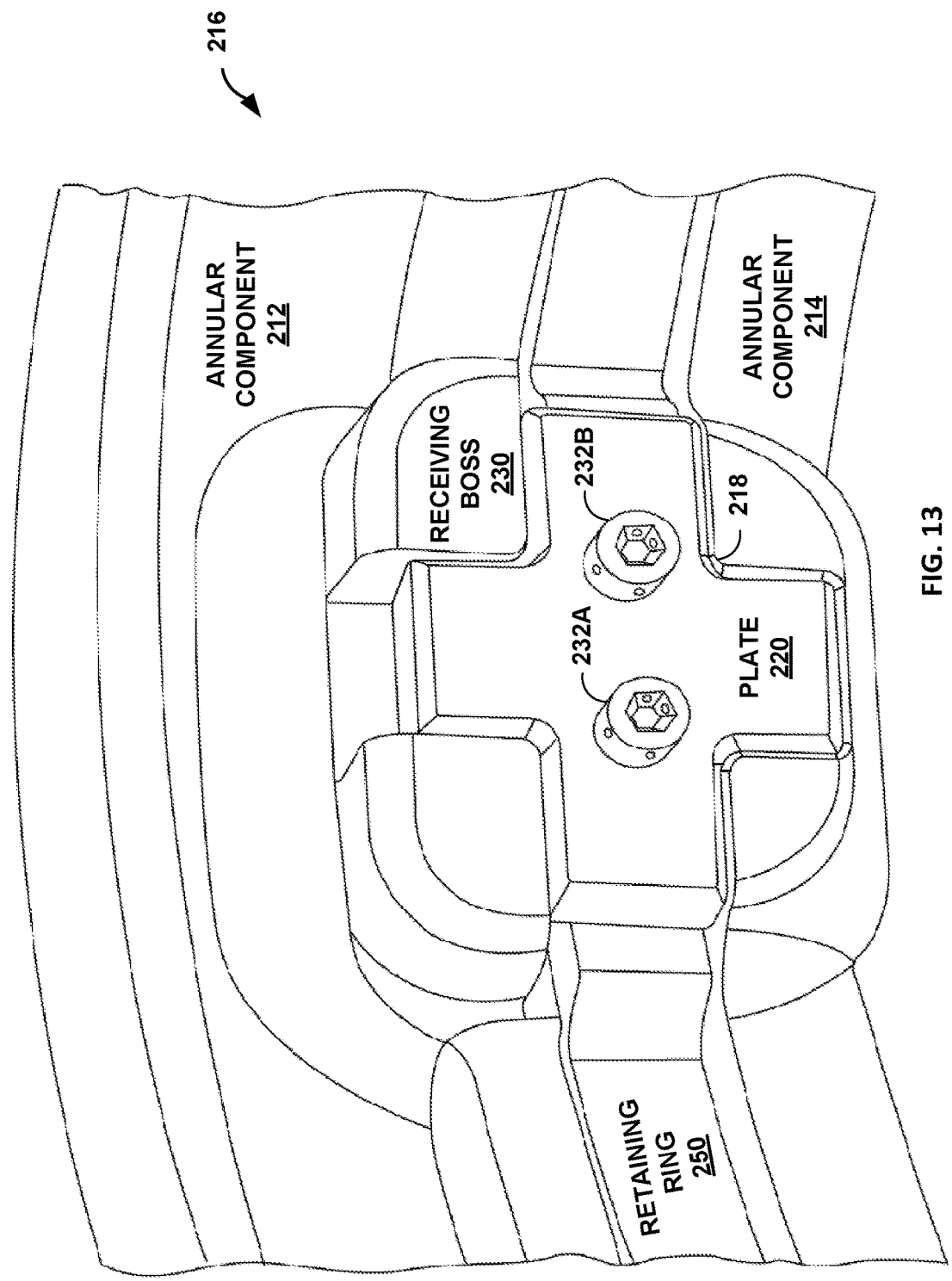
FIG. 13 is a close-up perspective view of an example plate in a recess defined by a receiving boss formed by two annular components of a vehicle wheel.

In some examples, a plate that inhibits relative rotation between annular components of a vehicle wheel may include a shape other than a rounded rectangle. FIGS. 12 and 13 illustrate additional example plates with a cross shape. Other example plates may include shapes not depicted in FIGS. 1-13, such as an oval, a circle, or any other suitable shape.

FIG. 12 is a top view of an example plate 220 positioned in a recess 218, where the plate 220 is secured to a retaining ring 250 by two attachment elements 232A, 232B without a strap. In some examples, either in addition to or instead of attachment elements 232A, 232B, a strap like strap 26A or 26B shown in FIG. 1 may be used to attach plate 220 to retaining ring 250. Each of plate 220 and recess 218 may include a cross shape. FIG. 12 depicts plate 220 in contact with recess 218 at interior corner wall 234A and interior corner wall 234B of the cross-shaped recess 218. Relative movement between annular components 212, 214 may have caused plate 220 to move such that plate 220 is in contact with interior corner wall 234A and interior corner wall 234B of recess 218. In this relative positioning, receiving boss 230 may apply stress to plate 220 at the interior corner wall 234A and interior corner wall 234B of the cross-shaped recess 218, as shown by the shading on plate 220. The portions of plate 220 that are near to interior corner wall 234C and interior corner 234D may experience lower stresses than the portions of plate 220 that are near to interior corner wall 234A and interior corner wall 234B. In some examples, the walls of plate 220 may not be in contact with interior corner wall 234C and interior corner wall 234D of recess 218. Rotation between annular components 212, 214 may cause plate 220 to move within recess 218, such that the locations of contact between plate 220 and portions of annular components 212, 214 defining recess 218 may vary depending on the relative arrangement of annular components 212, 214.

FIG. 13 is a close-up perspective view of plate 220 in recess 218 defined by receiving boss 230 formed by annular components 212, 214 of a vehicle wheel 210. FIG. 13 depicts an example configuration in which receiving boss 230 protrudes outward from annular surface 216 of vehicle wheel 210. Attachment elements 232A, 232B may mechanically connect plate 220 to retaining ring 250, which may be positioned between annular components 212, 214. In some examples, retaining ring 250 may include two or more portions that are held together by attachment elements 232A, 232B and plate 220. Attachment elements 232A, 232B may be sized large enough such that the torque load that is transferred from plate 220 to attachment elements 232A, 232B is reduced.

Figure 14:
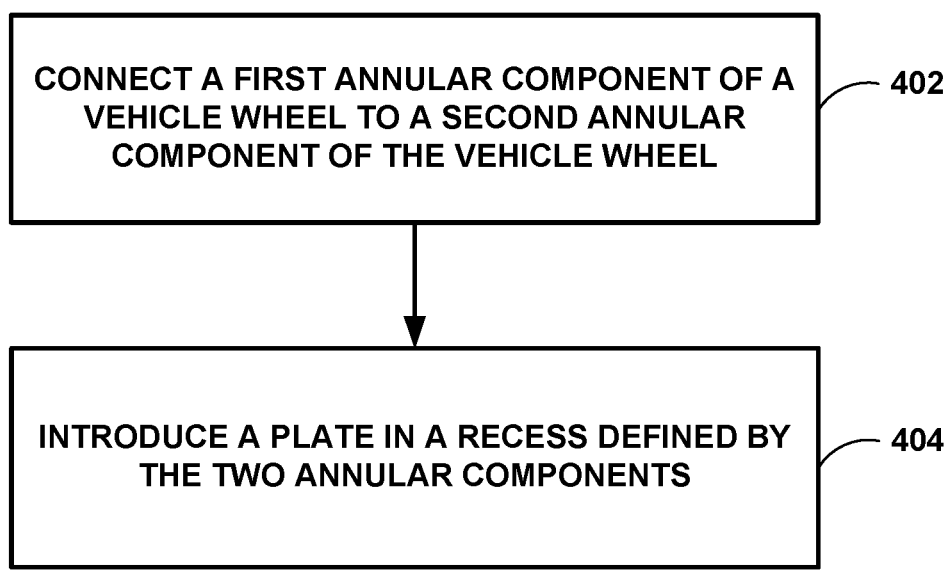
FIG. 14 is a flow diagram illustrating an example method of assembling a vehicle wheel.
Figure 15:
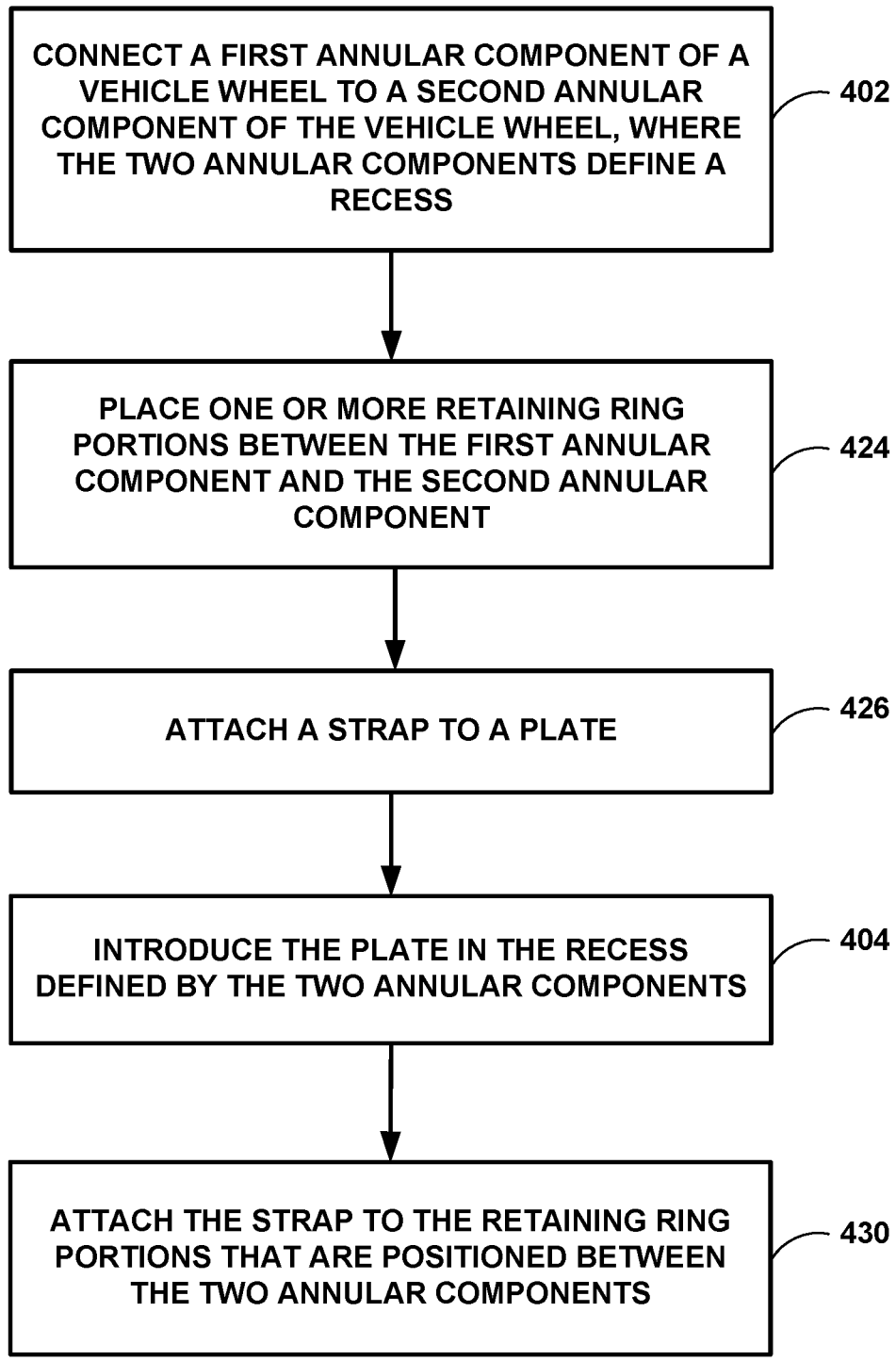
FIG. 15 is a flow diagram illustrating an example method of assembling a vehicle wheel.

FIG. 14 is a flow diagram illustrating an example method of assembling a vehicle wheel. Although FIG. 14, as well as FIG. 15, are described with respect to vehicle wheel 10 (FIG. 1), in other examples, the method may be used with other vehicle wheels including annular components, a plate, and a strap. The example method of FIG. 14 includes connecting annular component 12 of vehicle wheel 10 to annular component 14 of vehicle wheel 10 such that annular components 12, 14 may be aligned about axis of rotation 24 (402). For example, annular components 12, 14 may be mechanically connected to each other using a retaining ring. As an example, one or more retaining ring portions may be positioned between annular components 12, 14. The retaining ring portions may include two retaining ring halves, each of which may span one hundred and eighty degrees of vehicle wheel 10. The retaining ring portions may be placed between the ends of annular components 12, 14 to hold annular component 14 in place.

When annular component 12 is mechanically connected to annular component 14, annular components 12, 14 may define radially outer surface 22, which is configured to receive a tire. In addition, the method may include connecting annular components 12, 14 such that annular components 12, 14 define recess 18 along annular surface 16. Recess 18 may be defined by receiving boss 30 which may include portions of annular components 12, 14 that protrude from annular surface 16.

The example method of FIG. 14 further includes introducing plate 20 in recess 18 defined by annular components 12, 14 (404). When plate 20 is received in recess 18, plate 20 may help inhibit relative rotation between annular components 12, 14 about axis of rotation 24. The interior walls of recess 18 may contact the surfaces of plate 20 and impart stresses on plate 20. In some examples, plate 20 may include smaller dimensions than recess 18 so that plate 20 can move and rotate within recess 20.

One or more attachment elements 32A-32C may be used to secure plate 20 and/or strap 26 to the retaining ring portions 50 to hold the retaining ring portions 50 in place, to hold plate 20 and/or strap 26 in place relative to the retaining ring portions 50, or any combination thereof. The attachment elements may extend into plate 20, strap 26, and/or the retaining ring portions 50. The attachment elements, plate 20, and/or strap 26 may hold the retaining ring portions 50 in place to prevent annular component 14 from disconnecting from annular component 12.

In some examples, vehicle wheel 10 may include strap 26. FIG. 15 is a flow diagram illustrating another example method of assembling a vehicle wheel. The method shown in FIG. 15 includes connecting annular components 12, 14 to define recess 18 (402). Recess 18 may be defined by receiving boss 30 that includes portions of each of annular components 12, 14. Annular components 12, 14 may be mechanically connected after annular component 14 has received a tire on radially outer surface 22. One or more portions or retaining ring 50 may be placed between annular components 12, 14 (424). The portions of retaining ring 50 may hold annular component 14 in place. The one or more portions or retaining ring 50 may be placed between annular components 12, 14 after annular components 12, 14 have been mechanically connected. The method of FIG. 15 further includes attaching strap 26 to plate 20 (426). Strap 26 may be attached to plate 20 by one or more attachment elements 32B such as a rivet or a bolt. In some examples, strap 26 may be attached to plate 20 to create a subassembly before introducing plate 20 in recess 18. This may facilitate the ease of final wheel assembly and simplify the assembly process. For example, plate 20 may be easier to handle with strap 26 attached, and the securement of plate 20 to annular components 12, 14 may be more streamlined when strap 26 is pre-attached to plate 20 before introducing plate 20 in recess 18. In other examples, however, strap 26 may be attached to plate 20 after plate 20 is introduced in recess 18.

The example method of FIG. 15 further includes introducing plate 20 in recess 18 defined by annular components 12, 14 (404). According to the example method of FIG. 15, strap 26 may be attached to plate 20 before plate 20 is introduced in recess 18.

The example method of FIG. 15 further includes attaching strap 26 to the retaining ring portions that are positioned between annular components 12, 14 (430). Strap 26 may be attached to each of the retaining ring portions by one or more attachment elements such as a bolt. The attachment elements and strap 26 may hold the retaining ring portions together. In some examples, annular components 12, 14 may define two recesses that are diametrically opposed along annular surface 16. A plate may be introduced into each of the two recesses. A strap attached to each plate may be connected to each of the two retaining ring halves to hold the retaining ring halves in place.

The following examples may illustrate one or more of the techniques of this disclosure.

Example 1

A vehicle wheel includes a first annular component, a second annular component configured to be separable from the first annular component and mechanically connected to and aligned with the first annular component about an axis of rotation of the vehicle wheel, and a plate. When the first and second annular components are mechanically connected, the first and second annular components are configured to receive a tire and define a recess along an annular surface of the first and second annular components, the recess being configured to receive the plate. When the plate is received in the recess, the plate inhibits relative rotation between the first annular component and the second annular component about the axis of rotation of the vehicle wheel.

Example 2

The vehicle wheel of example 1, wherein the recess has a rectangular shape, and the plate has a rectangular shape and defines rounded corners.

Example 3

The vehicle wheel of examples 1-2 or any combination thereof, wherein the plate includes aluminum.

Example 4

The vehicle wheel of examples 1-3 or any combination thereof, further including a strap configured to hold the plate in the recess, wherein the strap is attached to the plate.

Example 5

The vehicle wheel of example 4, wherein the strap includes steel.

Example 6

The vehicle wheel of examples 4-5 or any combination thereof, further including a retaining ring positioned between the first and second annular components, wherein the strap is attached to the retaining ring.

Example 7

The vehicle wheel of example 6, wherein the strap is attached to the plate by at least a rivet, and wherein the strap is attached to the retaining ring by at least a bolt.

Example 8

The vehicle wheel of examples 1-7 or any combination thereof, wherein the recess defined by the first and second annular components includes a base surface on which the plate is positioned, and the vehicle wheel further includes a strap extending across the recess to hold the plate in the recess, the plate being positioned between the strap and the base surface of the recess.

Example 9

The vehicle wheel of examples 1-8 or any combination thereof, wherein the plate comprises a first plate, and the vehicle wheel further includes a second plate. When the first and second annular components are mechanically connected, the first and second annular components define a second recess along the annular surface, the second recess being configured to receive the second plate. When the second plate is received in the second recess, the second plate inhibits relative rotation between the first annular component and the second annular component about the axis of rotation of the vehicle wheel.

Example 10

The vehicle wheel of example 9, wherein the first plate and the second plate are diametrically opposed.

Example 11

The vehicle wheel of examples 1-10 or any combination thereof, further including a retaining ring positioned between the first and second annular components, wherein the retaining ring is configured to hold the first annular component and the second annular component together when the first and second annular components have received the tire. The vehicle wheel further includes a strap configured to hold the plate in the recess, wherein the strap is attached to the plate, and a bolt configured to attach the strap to the retaining ring.

Example 12

The vehicle wheel of examples 1-11 or any combination thereof, wherein the plate has a rounded rectangular outer perimeter and the recess has a rounded rectangular shape.

Example 13

The vehicle wheel of examples 1-12 or any combination thereof, wherein the recess includes a base surface that is approximately parallel to the annular surface, wherein the plate is configured to contact the base surface when the plate is received in the recess.

Example 14

The vehicle wheel of examples 1-13 or any combination thereof, wherein the plate includes a longest dimension along a perimeter of the plate of greater than two centimeters and less than six centimeters.

Example 15

The vehicle wheel of examples 1-14 or any combination thereof, wherein the portions of the first and second annular components defining the recess have at least one of a lubricating or hardening coating or treatment.

Example 16

A method of assembling a vehicle wheel, the method including introducing a plate in a recess defined by first and second annular components, the second annular component being configured to be separable from the first annular component and mechanically connected to and aligned with the first annular component about an axis of rotation of the vehicle wheel. When the first and second annular components are mechanically connected, the first and second annular components are configured to receive a tire and define the recess along an annular surface. When the plate is received in the recess, the plate inhibits relative rotation between the first annular component and the second annular component about the axis of rotation of the vehicle wheel.

Example 17

The method of example 16, wherein a retaining ring holds the first annular component and the second annular component together, wherein the method further includes attaching a strap to the plate to hold the plate in the recess and attaching the strap to the retaining ring.

Example 18

The method of examples 16-17 or any combination thereof, wherein the recess defined by the first and second annular components includes a base surface on which the plate sits, and the method further includes attaching a strap to the retaining ring such that the strap extends across the recess, the plate being positioned between the strap and the base surface of the recess.

Example 19

The method of examples 16-18 or any combination thereof, wherein a retaining ring holds the first annular component and the second annular component together, wherein the method further includes attaching the plate to the retaining ring.

Example 20

The method of examples 16-19 or any combination thereof, further including mechanically connecting the first annular component to the second annular component, and placing one or more retaining ring portions between the first annular component to the second annular component. The method further includes attaching a strap to the plate before introducing the plate in the recess, and attaching the strap to the one or more retaining ring portions.

Example 21

The method of examples 16-20 or any combination thereof, wherein the plate includes a first plate, the method further including introducing a second plate in a second recess defined by the first and second annular components. When the first and second annular components are mechanically connected, the first and second annular components define the second recess along the annular surface, the second recess being configured to receive the second plate. When the second plate is received in the second recess, the second plate inhibits relative rotation between the first annular component and the second annular component about the axis of rotation of the vehicle wheel. The first plate and the second plate are diametrically opposed.

Example 22

A vehicle wheel includes a first annular component and a second annular component configured to be separable from the first annular component and mechanically connected to and aligned with the first annular component about an axis of rotation of the vehicle wheel. The vehicle wheel further includes a first plate, a second plate, a first strap configured to fix the first plate relative to the first and second annular components, and a second strap configured to fix the second plate relative to the first and second annular components. When the first and second annular components are mechanically connected, the first and second annular components are configured to receive a tire and define a first recess and a second recess along an annular surface of the first and second annular components, the first recess and being configured to receive the first plate, and the second recess and being configured to receive the second plate. When the first plate is received in the first recess, the first plate inhibits relative rotation between the first annular component and the second annular component about the axis of rotation of the vehicle wheel. When the second plate is received in the second recess, the second plate inhibits relative rotation between the first annular component and the second annular component about the axis of rotation of the vehicle wheel. Moreover, the first strap is configured to hold the first plate in the first recess, and the second strap is configured to hold the second plate in the second recess.

Various examples have been described. These and other examples are within the scope of the following claims.

What is claimed is:

1. A vehicle wheel comprising:
 a first annular component;
 a second annular component configured to be separable from the first annular component and mechanically connected to and aligned with the first annular component about an axis of rotation of the vehicle wheel;
 a plate,
 wherein when the first and second annular components are mechanically connected, the first and second annular components are configured to receive a tire and define a recess along an annular surface of the first and second annular components, the recess being configured to receive the plate,
 wherein the recess comprises a base surface on which the plate is configured to be positioned; and
 a strap configured to extend across the recess to hold the plate in the recess, wherein when the plate is received in the recess and the strap extends across the recess, the plate is positioned between the strap and the base surface of the recess, and
 wherein when the plate is received in the recess, the plate inhibits relative rotation between the first annular component and the second annular component about the axis of rotation of the vehicle wheel.

2. The vehicle wheel of claim 1, wherein:
 the recess has a rectangular shape, and
 the plate has a rectangular shape and defines rounded corners.

3. The vehicle wheel of claim 1, wherein the strap includes steel, and wherein the plate includes aluminum.

4. The vehicle wheel of claim 1, further comprising a retaining ring positioned between the first and second annular components,
 wherein the strap is attached to the retaining ring, and
 wherein the strap is attached to the plate.

5. The vehicle wheel of claim 4, wherein the strap is attached to the plate by at least a rivet, and wherein the strap is attached to the retaining ring by at least a bolt.

6. The vehicle wheel of claim 1, wherein the plate comprises a first plate and the recess comprises a first recess, the vehicle wheel further comprising a second plate, wherein:
 when the first and second annular components are mechanically connected, the first and second annular components define a second recess along the annular surface, the second recess being configured to receive the second plate, and
 when the second plate is received in the second recess, the second plate inhibits relative rotation between the first annular component and the second annular component about the axis of rotation of the vehicle wheel.

7. The vehicle wheel of claim 6, wherein the first plate and the second plate are diametrically opposed when the first plate is received in the first recess and the second plate is received in the second recess.

8. The vehicle wheel of claim 1, further comprising:
 a retaining ring positioned between the first and second annular components, wherein the retaining ring is configured to hold the first annular component and the second annular component together when the first and second annular components have received the tire; and
 a bolt configured to attach the strap to the retaining ring.

9. The vehicle wheel of claim 1, wherein the plate has a rounded rectangular outer perimeter and the recess has a rounded rectangular shape.

10. The vehicle wheel of claim 9, wherein the base surface is approximately parallel to the annular surface, wherein the plate is configured to contact the base surface when the plate is received in the recess.

11. The vehicle wheel of claim 1, wherein the plate includes a longest dimension along a perimeter of the plate of greater than two centimeters and less than six centimeters.

12. The vehicle wheel of claim 1, wherein the portions of the first and second annular components defining the recess have at least one of a lubricating or hardening coating or treatment.

13. A vehicle wheel comprising:
 a first annular component;
 a second annular component configured to be separable from the first annular component and mechanically connected to and aligned with the first annular component about an axis of rotation of the vehicle wheel;
 a first plate having a rectangular shape and defining rounded corners;
 a second plate;
 a first strap configured to fix the first plate relative to the first and second annular components; and
 a second strap configured to fix the second plate relative to the first and second annular components,
 wherein when the first and second annular components are mechanically connected, the first and second annular components are configured to receive a tire and define a first recess and a second recess along an annular surface of the first and second annular components, the first recess being configured to receive the first plate, and the second recess being configured to receive the second plate,
 wherein when the first plate is received in the first recess, the first plate inhibits relative rotation between the first annular component and the second annular component about the axis of rotation of the vehicle wheel,
 when the second plate is received in the second recess, the second plate inhibits relative rotation between the first annular component and the second annular component about the axis of rotation of the vehicle wheel,
 wherein the first strap is configured to hold the first plate in the first recess, and
 wherein the second strap is configured to hold the second plate in the second recess.

14. The vehicle wheel of claim 13, wherein the first recess comprises a base surface on which the first plate is configured to be positioned, wherein the first strap is configured to extend across the first recess to hold the first plate in the first recess, wherein when the first plate is received in the first recess and the first strap extends across the first recess, the first plate is positioned between the first strap and the base surface of the first recess.

15. The vehicle wheel of claim 13, further comprising a retaining ring positioned between the first and second annular components, wherein the first and second straps are attached to the retaining ring.

16. The vehicle wheel of claim 13, wherein the first strap is attached to the first plate, and wherein the second strap is attached to the second plate.

17. A method of assembling a vehicle wheel, the method comprising:
- introducing a plate in a recess defined by first and second annular components, wherein the recess comprises a base surface on which the plate is configured to be positioned, the second annular component being configured to be separable from the first annular component and mechanically connected to and aligned with the first annular component about an axis of rotation of the vehicle wheel; and
- positioning a strap across the recess to hold the plate in the recess, wherein when the plate is received in the recess and the strap extends across the recess, the plate being positioned between the strap and the base surface of the recess,
- wherein when the first and second annular components are mechanically connected, the first and second annular components are configured to receive a tire and define the recess along an annular surface, and
- wherein when the plate is received in the recess, the plate inhibits relative rotation between the first annular component and the second annular component about the axis of rotation of the vehicle wheel.

18. The method of claim 17, wherein a retaining ring holds the first annular component and the second annular component together, the method further comprising:
- attaching the strap to the plate to hold the plate in the recess; and
- attaching the strap to the retaining ring.

19. The method of claim 17, further comprising:
- mechanically connecting the first annular component to the second annular component;
- placing one or more retaining ring portions between the first annular component and the second annular component;
- attaching the strap to the plate before introducing the plate in the recess; and
- attaching the strap to the one or more retaining ring portions.

20. The method of claim 17, wherein the plate comprises a first plate and the recess comprises a first recess, the method further comprising introducing a second plate in a second recess defined by the first and second annular components, wherein:
- when the first and second annular components are mechanically connected, the first and second annular components define the second recess along the annular surface, the second recess being configured to receive the second plate,
- when the second plate is received in the second recess, the second plate inhibits relative rotation between the first annular component and the second annular component about the axis of rotation of the vehicle wheel, and
- the first plate and the second plate are diametrically opposed when the first plate is received in the first recess and the second plate is received in the second recess.

* * * * *